(12) United States Patent
Sana et al.

(10) Patent No.: US 9,079,654 B2
(45) Date of Patent: Jul. 14, 2015

(54) ASSEMBLING METHOD OF MANDREL USED FOR MANUFACTURING COMPOSITE MATERIAL STRUCTURE AND ASSEMBLING APPARATUS OF MANDREL

(75) Inventors: Toshikazu Sana, Kakamigahara (JP); Naoki Tamura, Kakamigahara (JP); Tomoya Takahashi, Ibi-gun (JP); Toshiaki Takechi, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 394 days.

(21) Appl. No.: 13/518,984

(22) PCT Filed: Dec. 21, 2010

(86) PCT No.: PCT/JP2010/007392
§ 371 (c)(1),
(2), (4) Date: Jul. 20, 2012

(87) PCT Pub. No.: WO2011/077699
PCT Pub. Date: Jun. 30, 2011

(65) Prior Publication Data
US 2013/0117983 A1    May 16, 2013

(30) Foreign Application Priority Data
Dec. 25, 2009    (JP) .................. 2009-295576

(51) Int. Cl.
B29C 70/44 (2006.01)
B29C 33/00 (2006.01)
B64C 1/06 (2006.01)
B29C 33/38 (2006.01)
B64F 5/00 (2006.01)

(52) U.S. Cl.
CPC .............. B64C 1/069 (2013.01); B29C 33/38 (2013.01); B64F 5/0009 (2013.01); Y10T 29/4978 (2015.01); Y10T 29/49828 (2015.01); Y10T 29/53539 (2015.01)

(58) Field of Classification Search
CPC ...... B21C 47/30; B23B 31/40; B23B 31/404; B23B 31/4046; B23B 31/4006; B64F 5/0009; B28B 7/0014; B28B 2007/005; B28B 21/82; B28B 7/30; B29C 33/005; B29C 33/38; B29C 33/485; B29C 53/821; B29C 53/824; B29C 53/825; B29C 53/827; B29C 70/30; B29C 70/38; B29C 70/382; B29C 53/70; B29C 53/72; B29C 70/32; B29C 70/326; B29C 70/323; B29C 70/386; B29D 30/24
USPC ........... 29/281.6, 897.2, 281.5, 428; 156/245, 156/189, 285, 415, 417, 242, 173, 169, 187, 156/286, 287, 414, 420; 242/573.8, 576.1, 242/571, 576; 264/219, 220, 221, 511, 512, 264/518; 279/2.15, 2.16; 425/402, 403, 54, 425/55, 57, 56
See application file for complete search history.

(56) References Cited

U.S. PATENT DOCUMENTS

| | | | | |
|---|---|---|---|---|
| 4,456,036 A | * | 6/1984 | Rossi .............................. | 140/105 |
| 7,166,251 B2 | * | 1/2007 | Blankinship ................... | 264/258 |
| 2004/0065775 A1 | * | 4/2004 | Buge et al. .................... | 244/53 R |
| 2005/0039842 A1 | * | 2/2005 | Clark et al. .................... | 156/173 |
| 2010/0083504 A1 | | 4/2010 | Johnson et al. | |
| 2010/0223772 A1 | | 9/2010 | Johnson et al. | |

FOREIGN PATENT DOCUMENTS

| | | |
|---|---|---|
| JP | A-02-059328 | 2/1990 |
| JP | U-05-024321 | 3/1993 |
| JP | A-10-016085 | 1/1998 |
| JP | A-2007-532384 | 11/2007 |
| WO | WO 2006/001860 A2 | 1/2006 |

OTHER PUBLICATIONS

International Search Report issued in International Application No. PCT/JP2010/007392 dated Feb. 8, 2011.

* cited by examiner

Primary Examiner — David Bryant
Assistant Examiner — Jun Yoo
(74) Attorney, Agent, or Firm — Oliff PLC

(57) ABSTRACT

A technique which can assemble a mandrel having a substantially cylindrical shape and being dividable into plurality of segments, which is used for manufacturing, for example, a fuselage of an aircraft, with high position accuracy and an easy manner. In a segment fastening step, a segment which is a fastened target is fastened to a specified fastening portion which is one of a plurality of fastening portions set along a pair of support rings placed to face each other. In a rotation step, before the segment fastening step, the support rings are rotated so that the specified fastening portion is located at an uppermost portion of the support rings. In the segment fastening step, the segment which is the fastened target is placed between the support rings and lifted vertically up to a height corresponding to the specified fastening portion and then fastened to the support rings.

8 Claims, 22 Drawing Sheets

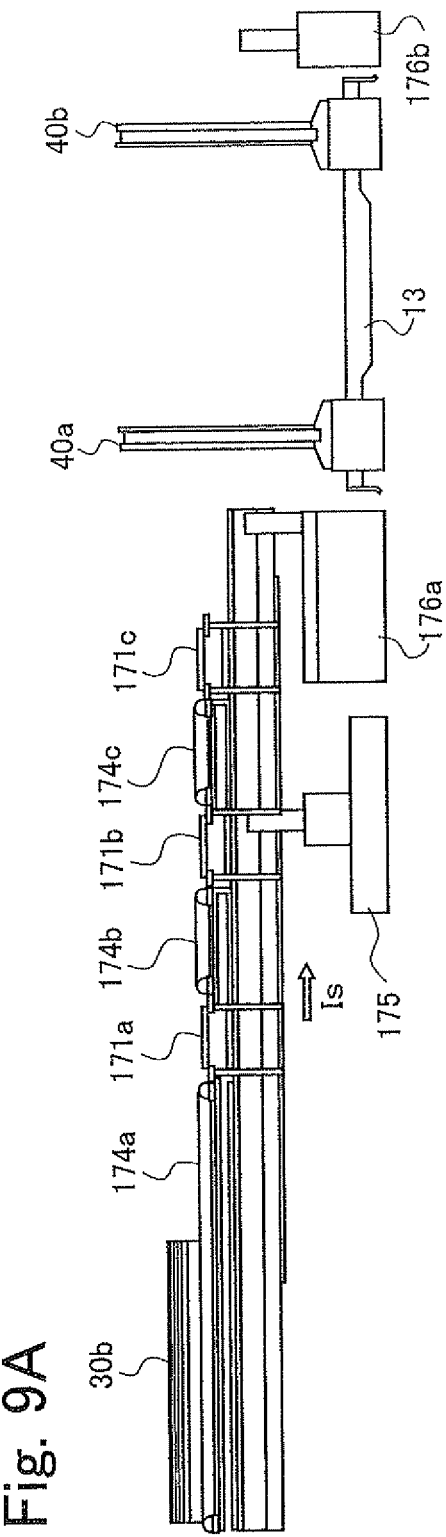
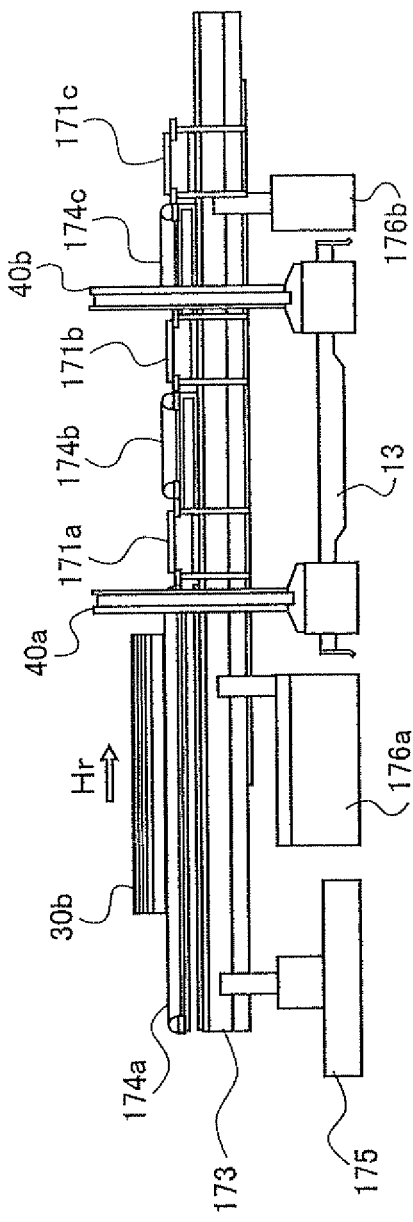

ASSEMBLING METHOD OF MANDREL USED FOR MANUFACTURING COMPOSITE MATERIAL STRUCTURE AND ASSEMBLING APPARATUS OF MANDREL

TECHNICAL FIELD

The present invention relates to an assembling method of a mandrel which is used for manufacturing a composite material structure using a fiber-reinforced resin composite material and is constructed of a plurality of segments assembled in a tubular shape, and an assembling apparatus used in the assembling method. Particularly, the present invention relates to an assembling method of a mandrel suitably used for manufacturing a huge composite material structure for use as a fuselage of an aircraft, etc., and an assembling apparatus of the mandrel.

BACKGROUND ART

In recent years, fiber-reinforced resin composite materials (hereinafter suitably referred to as "composite materials") have been widely used in fields in which metal materials have been used so far. Among the composite materials, carbon-fiber-reinforced composite materials which are formed such that carbon fibers used as reinforced fibers, are impregnated with matrix resin such as epoxy resin, have a smaller weight and a higher strength than metal materials. Because of this, the carbon-fiber-reinforced composite materials are widely used in fields of sport activity articles, industrial machines, and aerospace.

Among these fields, in the field of aerospace, for example, in structures such as wings or a fuselage of an aircraft, a stiffened panel in which a skin comprising a composite material is integrated with a stiffener which is a lightweight metal frame member, has been used. As a typical stiffener, there is a stringer. Stringers are combined to conform in shape to the structure and supported by jigs. Plural sheets of prepreg are laminated (stacked) together with the stringers, and the resulting laminate is pressurized and heated in an autoclave. As a result, the prepreg is cured into the skin, and the stiffeners are adhesively attached to and integrated with the skin, thereby forming a stiffened panel.

As an exemplary structure comprising the stiffened panel, as shown in FIG. 22, there is a fuselage 101 or the like of an aircraft which is formed as a one piece barrel (OPB). The fuselage 101 includes a skin 102 and a plurality of stringers 103 adhesively attached to the inner surface of the skin 102, and has an opening 104 which becomes a door when the fuselage 101 is assembled as the aircraft and openings 105 which become windows when the fuselage 101 is assembled as the aircraft.

As a technique for manufacturing the above stated structure of the aircraft, there is known a composite barrel section of an aircraft fuselage as disclosed in Patent Literature 1. According to this Patent Literature, the barrel section is defined as "an enclosed shell structure extending 360 degrees about an axis". To manufacture this barrel section, a mold configured such that a plurality of (e.g., six) tool segments are arranged in a cylindrical shape and supported by using tool fixtures.

Patent Literature 1 discloses as an exemplary manufacturing system of the composite barrel section, a plurality of manufacturing stations are laid out in series and a barrel section tool assembly (hereinafter referred to as a tool assembly) including the mold is introduced into each of the manufacturing stations.

To be specific, firstly, in a stiffener loading station, a plurality of stiffener grooves formed on the respective tool segments are loaded with a plurality of stiffeners, and then the tool fixtures are filled into the tool fastener members and supported in a cylindrical shape, thereby forming a single mold (tool assembly in the same Patent Literature). At this time, the tool fixtures are rotatably supported on a tool support structure by means of a plurality of rollers such that the tool fixtures are rotatable along their longitudinal axis.

Then, the mold supported and constructed in the cylindrical shape is transported to a skin laminating station by a tool support structure. Here, the mold is rotated along the longitudinal axis, to laminate fiber tow (bundle of untwisted continuous filaments which is impregnated with thermosetting resin) by a fiber placement machine, thereby forming a laminate (corresponding to skin) on the outer periphery of the mold.

Then, the mold (tool assembly in the same Patent Literature) provided with the laminate is transported to a vacuum station by the tool support structure. Here, a pressure pad is installed on the outer periphery of the laminate, and a vacuum bag is installed on the periphery of the laminate to evacuate the vacuum bag. Then, the mold (tool assembly) attached with the vacuum bag is transported to a curing station by a gantry beam and is treated in an autoclave, to cure the laminate and the stiffener. In this way, the laminate and the stiffener are cured to form a stiffened panel on the outer periphery of the mold.

The mold (tool assembly) provided with the stiffened panel is transported to an inspection station by the gantry beam. The cured laminate (skin) is inspected to check whether or not it has voids or disbonds. Then, the cured laminate (skin) is transported to a trimming station by the gantry beam and subjected to trimming and drilling operations. Then, the tool segments are removed from the stiffened panel and the stiffened panel is returned to the stiffener loading station, and the stiffened panel (tool assembly) from which the tool segments have been removed is transported to a final assembly station by the tool support structure. The stiffened panel is attached with a plurality of frame sections, thereby completing a composite barrel section.

As described above, when the OPB is manufactured, the mandrel of a substantially cylindrical shape is used as the mold. The mandrel is configured in such a manner that a molded product (composite material structure) is molded on the outer peripheral surface thereof to form a hollow space of the OPB which is the molded product using the huge mold. To this end, the mandrel has a structure in which the mandrel is divided into a plurality of segments, for example, six segments, instead of a single huge tubular member. In this structure, the single huge mold need not be used, but the segments may be assembled as necessary. Therefore, this structure is useful in molding of the huge molded product such as the OPB.

CITATION LISTS

Patent Literature

Patent Literature 1: Translated PCT Application Publication No. 2007-532384

SUMMARY OF THE INVENTION

Technical Problem

Since the OPB which is the molded product is huge in size like the fuselage of the aircraft, it is difficult to assemble the segments of the cylindrical mandrel in a cylindrical shape. This work is very messy.

For example, in the case of the fuselage of the aircraft, its dimension is extremely great, for example, its diameter is about 4 to 6 m, and a length of the cylindrical shape is about 5 to 15 m. The stiffened panel (skin and stiffener) constituting the fuselage has a very small thickness with respect to the overall fuselage. Therefore, the mandrel used for manufacturing the stiffened panel is substantially equal in dimension to the outer shape of the fuselage. As disclosed in Patent Literature 1, the segments (tool segments in the same Patent Literature) of the mandrel are manufactured using metal such as "steel, invar, aluminum, or composites". It is not easy to assemble the pieces which are huge and heavy into a single mold.

If unevenness occurs on the outer periphery of the cylindrical shape when the plurality of segments are assembled into the single cylindrical mandrel, the stiffened panel formed on the outer periphery of the mandrel will have unevenness. For this reason, when the mandrel is assembled, it is necessary to ensure position accuracy so that a smooth outer peripheral surface is formed by the segments, rather than merely assembling the segments in a substantially cylindrical shape. Therefore, assembling of the metal pieces which are huge into a cylindrical shape with high position accuracy is very difficult and messy.

In general, to assemble a huge structure, using an overhead travelling crane, or the like, a large-sized constituent of the structure is lifted up and then moved horizontally to a predetermined location. However, when the plurality of segments are assembled in a single cylindrical shape with high accuracy, as described above, it is necessary to perform a messy operation to place the segment in a predetermined location if the overhead travelling crane is used. This is not efficient and cannot achieve high positioning accuracy.

The present invention is directed to solving the above mentioned problem, and an object of the present invention is to provide a technique in which segments of a mandrel which is a major component of a mold used for manufacturing a composite material structure such as a fuselage of an aircraft, has a substantially cylinder shape, and is dividable into a plurality of segments are assembled, with high position accuracy and in a simple manner.

Solution to Problem

To solve the above mentioned problems, according to the present invention, an assembling method of a mandrel for assembling a tubular mandrel by joining a plurality of segments together, the segments having a substantially rectangular shape and being parts into which the mandrel is divided along a center axis direction, comprises a segment fastening step of fastening one of the segments which is a fastened target to a specified fastening portion which is one of a plurality of fastening portions set along a circumferential direction on each of a pair of support rings facing each other; and a rotation step of rotating the pair of support rings to position the specified fastening portion at an uppermost portion of each of the support rings before the segment fastening step; wherein in the segment fastening step, the segment which is the fastened target is placed between the pair of support rings, is lifted up to a height position corresponding to the specified fastening portion along a vertical direction, and is fastened to the pair of support rings.

In accordance with this configuration, when the segment which is the fastened target is fastened to the support ring, its fastening portion is located at the uppermost portion of the support ring. The segment which is the fastened target moves in a vertically upward direction from a state in which the segment is located between the pair of support rings. In this way, the segment which is the fastened target is fastened to the uppermost portion of the support ring which is a predetermined position. In addition, the segment which is the fastened target is moved only in the vertical direction. Therefore, the segment which is the fastened target can be moved while stably maintaining the segment which is the fastened target, with a fixed attitude. Thus, positioning accuracy can be improved.

In the assembling method, preferably, the method comprises a segment joining step of, if the segment is fastened to at least one of two fastening portions adjacent to the specified fastening portion, joining the segment which is the fastened target to the segment adjacent to the specified fastening portion, after the segment fastening step.

In accordance with this configuration, in the segment fastening step, the segment which is the fastened target is fastened to the support ring, and in the segment joining step, the segments are joined together. Therefore, the mandrel is assembled in such a manner that the segments are fastened sequentially to the support rings and the segments are joined together. Thus, the mandrel can be assembled efficiently.

In the assembling method, preferably, in the segment fastening step, the segment which is the fastened target is lifted up toward the specified fastening portion in such a manner that at least portions in the vicinity of four corners of the segment having the substantially rectangular shape are supported and displaced in an upward direction.

In accordance with this configuration, the segment which is the fastened target is fastened to the support ring while individually changing the positions of the portions in the vicinity of the four corners. Therefore, attitude control and position control of the segment which is the fastened target can be performed with high accuracy.

In the assembling method, preferably, in the segment fastening step, an annular fastening/guide mechanism provided between the support rings and the segment which is the fastened target guides the segment being lifted up to the specified fastening portion, and fastens the segment having reached the specified fastening portion to the support ring.

In accordance with this configuration, since the segment which is the fastened target is guided to be lifted up before it is fastened to the support ring, it can be positioned accurately on a fastening location (specified fastening portion).

In the assembling method, preferably, in the rotation step, each of the support rings is supported from below on at least two locations sandwiching a vertical line passing through a center axis of the support ring and is applied with a rotational force; and each of the support rings is supported on an upper portion of the support ring such that movement of the support ring in a direction of the center axis is restricted.

In accordance with this configuration, since the support ring is supported at the upper and lower portions thereof such that the support ring is rotatable, the support ring can be rotated while preventing it from falling.

In the assembling method, preferably, in the rotation step, a position detector section detects that a detected portion provided on the support ring has reached a predetermined detection position by rotation of the support ring, to determine that the specified fastening portion is positioned at an uppermost portion of each of the support rings.

In accordance with this configuration, since it can be detected that the specified fastening portion is in the uppermost portion, according to the rotation of the support ring, the support ring which is rotated can be positioned accurately.

The assembling method preferably comprises a support ring installation step of placing the pair of support rings such that the support rings face each other to allow the segment to be fastened to the support rings, before the segment fastening step which is performed firstly; wherein in the support ring installation step, the support rings are installed such that the specified fastening portion corresponding to the segment fastened firstly is positioned at the uppermost portion of each of the support rings.

In accordance with this configuration, the support ring is installed in a state in which the specified fastening portion is positioned in the uppermost portion. Therefore, the mandrel can be assembled efficiently.

In the assembling method, the specific configuration of the plurality of segments is not particularly limited. A preferable example is as follows. The plurality of segments include a first segment and a second segment which are different in shape; the plurality of fastening portions set on each of the pair of support rings include a first fastening portion to which the first segment is fastened, and a second fastening portion to which the second segment is fastened; the first fastening portion and the second fastening portion are set alternately on each of the pair of support rings along a circumferential direction of the support ring; and the segment fastening step includes a first segment fastening step of fastening the first segment to the first fastening portion, and a second segment fastening step of fastening the second segment to the second fastening portion.

In accordance with this configuration, the plurality of segments are divided into groups of two kinds of segments, and the fastening portions of the segments of respective kinds are predetermined, depending on the shape of the segments of respective kinds, etc. Therefore, the order in which the plurality of segments are fastened can be set easily.

The specific configuration of the first segment and the second segment is not particularly limited. For example, preferably, an obverse surface of the second segment having the substantially rectangular shape, which is a part of an outer peripheral surface of the mandrel, has a greater area than an obverse surface of the first segment, which is a part of the outer peripheral surface of the mandrel; the first segment fastening step is performed after all of the second segments are fastened to each of the support rings in every two locations along the circumferential direction in the second segment fastening step; and in the first segment fastening step, the first segment placed between the pair of support rings is lifted up to a location between two second segments at a height corresponding to the first fastening portion, is fastened to the pair of support rings and is joined to the second segment adjacent to the first segment.

In accordance with this configuration, all of the second segments having the obverse surfaces with a greater area are fastened to the support rings, and then the first segments having the obverse surfaces with a smaller area are sequentially fastened to the support rings. Therefore, the mandrel is assembled in such a manner that a segment (first segment) with a smaller area which is easily controlled in attitude and position is filled between segments (second segments) with a greater area. This allows the individual segments to be positioned easily and with higher accuracy. This makes it possible to assemble the mandrel easily and allows the outer peripheral surface of the assembled mandrel to have a smooth peripheral surface with a minimum level difference.

The present invention includes an assembling apparatus suitably for use in the above assembling method, in addition to the assembling method of the mandrel. Specifically, the assembling apparatus of a mandrel for use in the above assembling method of the mandrel of the present invention comprises a rail body inserted into a hollow space of the pair of support rings; a conveyor section provided on the rail body and configured to horizontally move the segment from a rear end of the rail body toward a tip end thereof; and a jack section provided on the rail body and configured to lift up the segment moved from the conveyor section, along a vertical direction; wherein the jack section includes segment support members which supports at least portions in the vicinity of four corners of the segment having the substantially rectangular shape and displaces the portions independently, along the vertical direction, between the support rings, in a state in which the rail body is inserted into the hollow space of the support rings.

The above and further objects, features and advantages of the invention will more fully be apparent from the following detailed description with reference to the accompanying drawings.

Advantageous Effects of the Invention

As described above, in accordance with the present invention, it is possible to assemble a mandrel having a substantially cylindrical shape and being dividable into a plurality of segments, easily and with high position accuracy.

BRIEF DESCRIPTION OF THE DRAWINGS

FIG. 1 is a perspective view showing an example of the overall configuration of a mold including a mandrel according to an embodiment of the present invention.

[FIG. 2]

[FIG. 3]

[FIG. 4]

FIG. 5 is a perspective view showing the overall configuration a precision rail which is an example of an assembling apparatus for assembling the mandrel of FIG. 1.

[FIG. 6]

FIG. 7 is a view of steps showing the overall configuration of an assembling method of the mandrel of FIG. 1.

FIG. 8 is a schematic view showing a state in which a second segment of #4 of FIG. 4 is placed on a jack section to fasten it to the support ring.

[FIG. 9] FIGS. 9A and 9B are side views of the precision rail showing the operation of the precision rail when the second segment of FIG. 8 is lifted up and fastened to the support ring.

[FIG. 10]

FIG. 11 is a schematic view showing a state in which the second segment of #4 of FIG. 4 is fastened to the support ring.

FIG. 12 is a schematic view showing a state in which a second segment of #6 of FIG. 4 is placed on the jack section to fasten it to the support ring.

FIG. 13 is a schematic view showing a state in which the second segment of #6 of FIG. 4 is fastened to the support ring.

FIG. 14 is a schematic view showing a state in which a second segment of #2 of FIG. 4 is placed on the jack section to fasten it to the support ring.

FIG. 15 is a schematic view showing a state in which the second segment of #6 of FIG. 4 is fastened to the support ring.

FIG. 16 is a schematic view showing a state in which a first segment of #3 of FIG. 4 is placed on the jack section to fasten it to the support ring.

FIG. 17 is a schematic view showing a work state in which the first segment of #3 of FIG. 4 is fastened to the support ring, and joined to the second segment of #2 and to the second segment of #4.

FIG. 18 is a schematic view showing a state in which a first segment of #5 of FIG. 4 is placed on the jack section to fasten it to the support ring.

FIG. 19 is a schematic view showing a work state in which the first segment of #5 of FIG. 4 is fastened to the support ring, and joined to the second segment of #4 and to the second segment of #6.

FIG. 20 is a schematic view showing a state in which a first segment of #1 of FIG. 4 is placed on the jack section to fasten it to the support ring.

FIG. 21 is a schematic view showing a work state in which the first segment of #1 of FIG. 4 is fastened to the support ring, and joined to the second segment of #6 and to the second segment of #2.

FIG. 22 is a perspective view showing an example of the configuration of a fuselage of an aircraft constructed as a one piece barrel (OPB) which is an example of a composite material structure.

Figure 1:
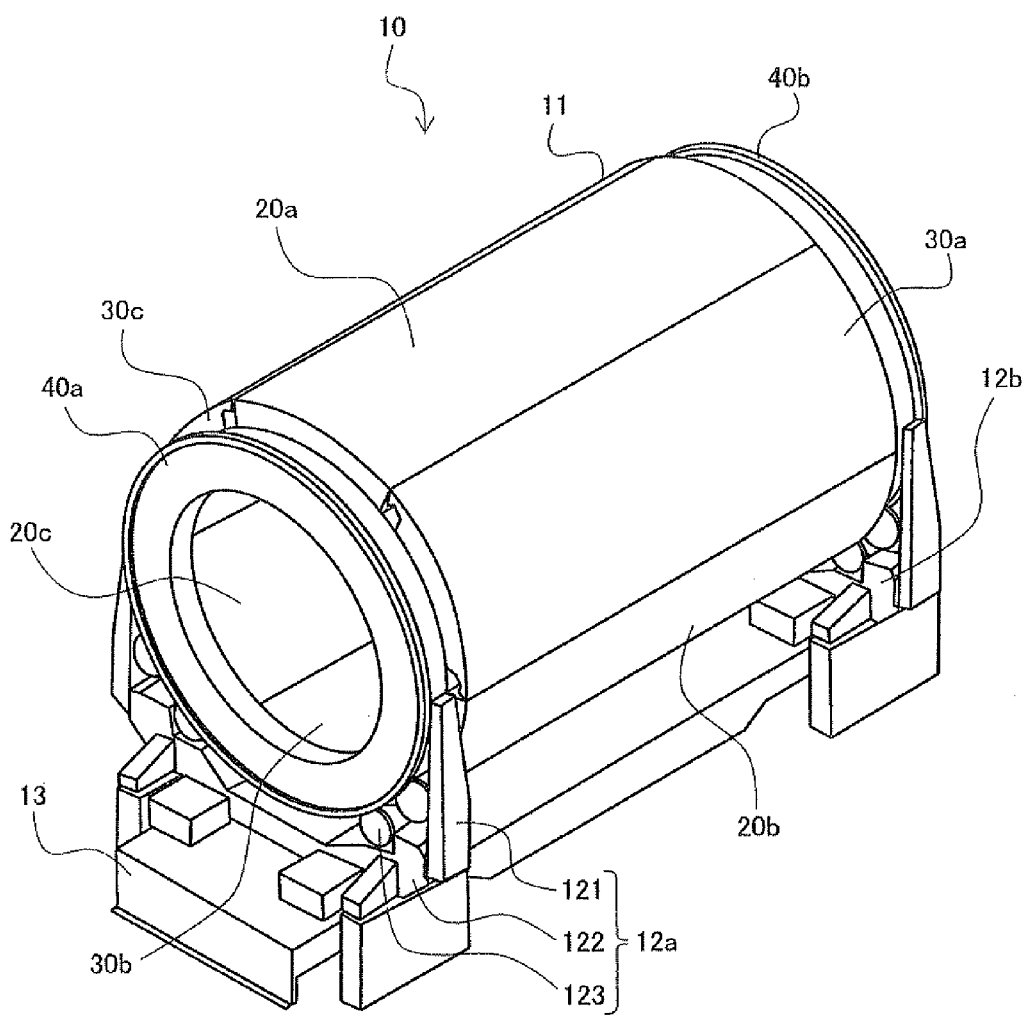
[FIG. 1]

REFERENCE SIGNS LISTS 10 mold
11 mandrel
16 ring rotation drive section
17 precision rail (assembling apparatus)
20, 20a to 20c first segment
21 obverse surface of first segment
30, 30a to 30c second segment
31 obverse surface of second segment
40, 40a, 40b support ring
42 female guide member (annular fastening/guide mechanism)
163 position detector section
171a to 171c jack section
171a-1, 171a-2 support rod member (segment support member)
171b-1, 171b-2 support rod member (segment support member)
173 rail body
174a~174c conveyor section
252, 352 male guide member (annular fastening/guide mechanism)

DESCRIPTION OF EMBODIMENTS

Hereinafter, preferred embodiments of the present invention will be described with reference to the drawings. Throughout the drawings, the same or corresponding components are designated by the same reference numerals and repetitive description thereof will not be given.

[Overall Configuration of Mold]

First of all, the overall configuration of a mold used for manufacturing a composite material structure (hereinafter referred to as mold) which is assembled by an assembling method according to the present embodiment will be described with reference to FIG. 1. FIG. 1 is a perspective view showing an example of the overall configuration of a mold including a mandrel according to an embodiment of the present invention.

As shown in FIG. 1, a mold 10 of the present embodiment comprises at least a mandrel 11 and a pair of support rings 40a, 40b located at both ends thereof. The mandrel 11 includes six segments 20a, 30a, 20b, 30b, 20c, and 30c which are joined together at side surfaces thereof. The both ends of the mandrel 11 are supported by the support rings 40a, 40b, respectively. This allows the six segments 20a to 20c and 30a to 30c to maintain a cylindrical shape. Hereinafter, the segments 20a to 20c and 30a to 30c are referred to as "segments 20, 30," when they are described collectively.

As described later, channel-shaped concave portions are formed on the obverse surfaces of the segments 20, 30, to attach stringers thereto, respectively. In FIG. 1, the channel-shaped concave portions are not shown, to clearly show the overall configuration. The configuration of the segments 20, 30, and the support rings 40a, 40b will be described specifically later.

The support rings 40a, 40b are rotatably supported by cradles 12a, 12b, respectively such that they extend in an upright position. In the present embodiment, the cradle 12a for supporting the support ring 40a includes a pair of arm sections 121, a cradle body 122 and a plurality of support rollers 123 (four in FIG. 1). The pair of arm sections 121 are provided to extend in an upright position and sandwich the outer periphery of the support ring 40a in the upright position. The cradle body 122 is positioned under the support ring 40a and supports the arm sections 121 at both ends thereof. The support rollers 123 are placed between the cradle body 122 and the support ring 40a (40b) such that the support ring 40a (40b) is rotatable by an external force. Since the cradle 12b for supporting the support ring 40b has the same configuration, description thereof will not be given.

A carriage 13 is configured to carry the cradles 12a, 12h, the support rings 40a, 40b, and the mandrel 11. In the present embodiment, the carriage 13 has a rectangular flat shape, and is provided with a plurality of wheels on the lower surface of the carriage 13, although not shown FIG. 1. The carriage 13 is able to carry the cradles 12a, 12b, the support rings 40a, 40b, and the mandrel 11, with the mold 10 placed thereon. In the present embodiment, the carriage 13 has an upper surface having a greater area to correspond to the dimension (axial length of a cylinder and a diameter of a cylinder) of the mandrel 11. In the state of FIG. 1, the cradles 12a, 12b are not in contact with the carriage 13 and stand for themselves on a floor surface such that the height of the support rings 40a, 40b which face each other is horizontally adjustable.

The specific configurations of the cradles 12a, 12b and the carriage 13 are not limited to those disclosed in the present embodiment, and various configurations may be used so long as their advantages, functions and the like can be achieved.

[Configuration of Segment]

Figure 2A:
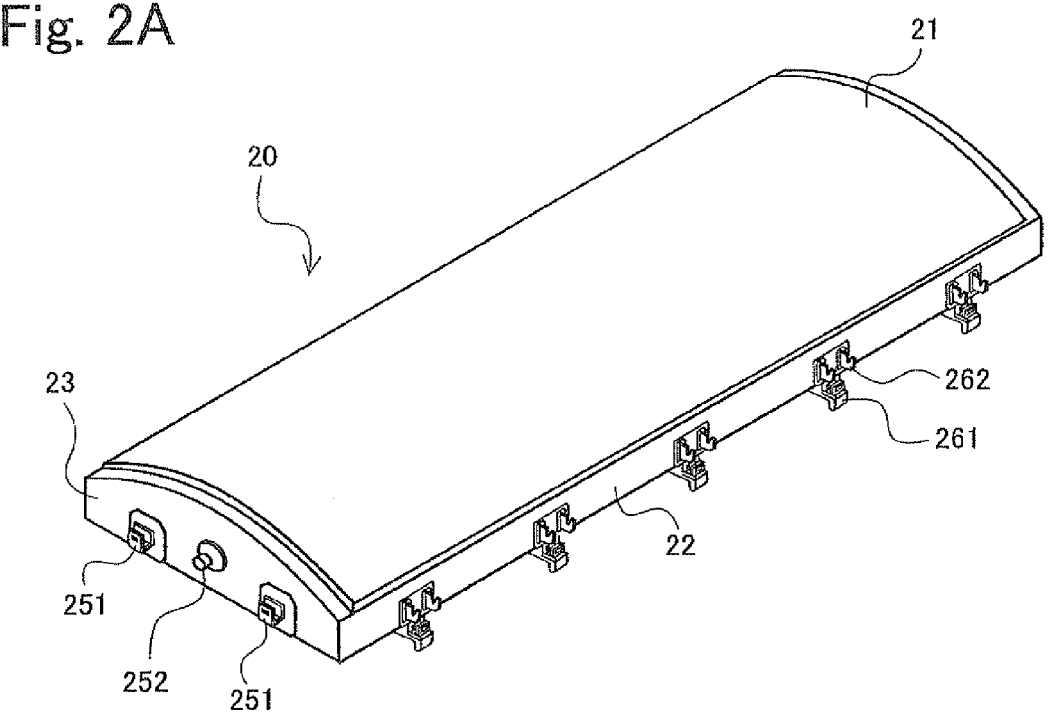
FIG. 2A is a perspective view showing the configuration of a first segment constituting the mandrel of FIG. 1.

Next, the six segments 20, 30 constituting the mandrel 11 will be described with reference to FIGS. 2A and 2B, and FIGS. 3A and 3B. FIG. 2A is a perspective view showing the configuration of a first segment constituting the mandrel 11 of FIG. 1, and FIG. 2B is a plan view of the first segment of FIG.

Figure 3A:
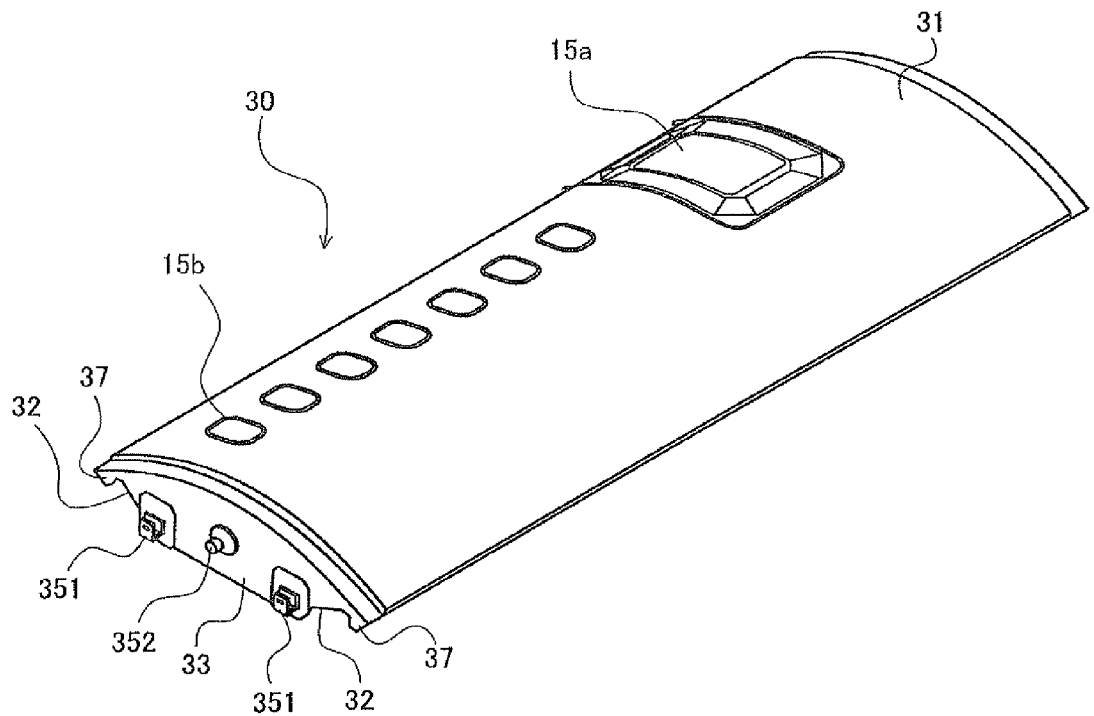
FIG. 3A is a perspective view showing the configuration of a second segment constituting the mandrel of FIG. 1.

2A when viewed from an end portion thereof. FIG. 3A is a perspective view showing the configuration of a second segment constituting the mandrel 11 of FIG. 1, and FIG. 3B is a plan view of the second segment of FIG. 3A when viewed from an end portion thereof.

Figure 2B:
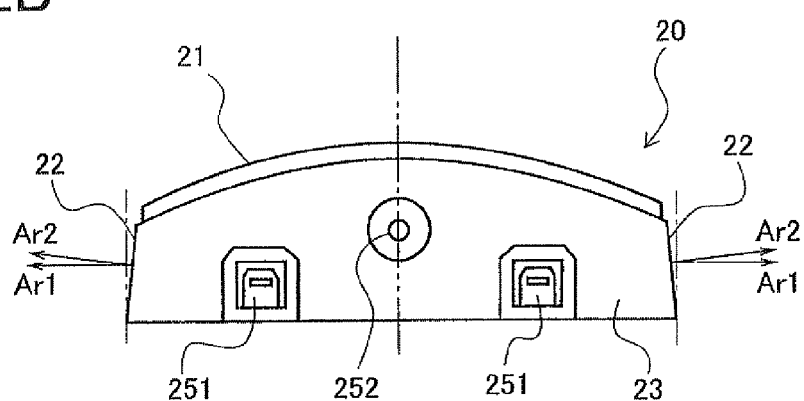
FIG. 2B is a plan view of the first segment of FIG. 2A when viewed from an end portion thereof.
Figure 3B:
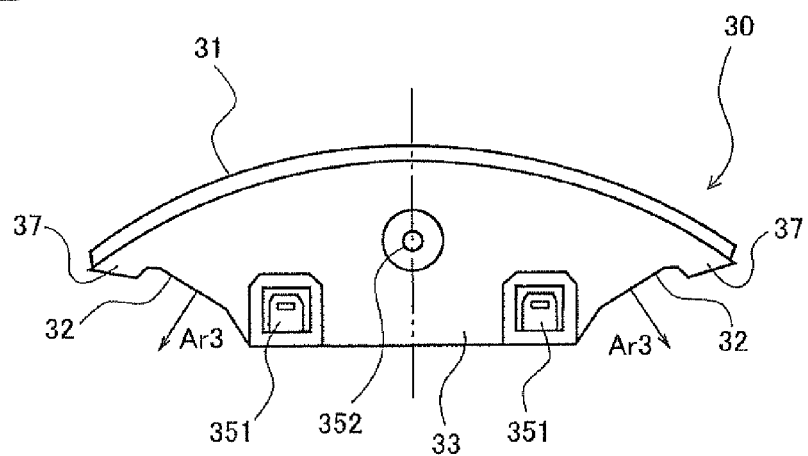
FIG. 3B is a plan view of the second segment of FIG. 3A when viewed from an end portion thereof.

In the present embodiment, the six segments 20a to 20c and 30a to 30c constituting the mandrel 11 are classified into the first segments 20a to 20c of FIGS. 2A and 2B, and the second segments 30a to 30c of FIGS. 3A and 3B. In description below with reference to FIGS. 2A to 2C and FIGS. 3A to 3C, the first segments 20a to 20c having the same shape are collectively referred to as "first segment 20," while the second segments 30a to 30c having the same shape are collectively referred to as "second segment 30."

The first segment 20 constituting the mandrel 11 and the second segment 30 constituting the mandrel 11, each of which has a substantially rectangular shape divided along a center axis direction. As shown in FIG. 2A, the first segment 20 entirely has a rectangular plate shape, an obverse surface 21 thereof is a convex-like curved surface (convex-shaped surface or convex-curved surface), and side surfaces 22 face a horizontal direction or a direction which is inclined upwardly with respect to the horizontal direction, in a state in which the first segment 20 is placed horizontally with the obverse surface 21 being on an upper side. In the present embodiment, for example, as shown in FIG. 2B, a normal-line direction of the side surface 22 faces the direction which is inclined upwardly, with respect to the horizontal direction.

As described later, in the present embodiment, when the mandrel 11 is assembled in a cylindrical shape, the second segments 30 are firstly fastened to the support rings 40a, 40b, and then the first segments 20 are fitted between the second segments 30 in a direction from below to above and fastened thereto. Therefore, to allow the first segments 20 to be fitted without any interference, it is required that the normal-line direction of the side surfaces 22 of the first segment 20 face the horizontal direction (arrow Ar1 direction of FIG. 2B). In other words, in the state where the first segment 20 is placed horizontally, the side surface 22 extends in a vertical direction (direction along one-dotted line of FIG. 2B).

After the one piece barrel (OPB) is molded using the mold 10 including the mandrel 11, the OPB is removed from the mold 10. The OPB is removed from the mold 10 by disassembling the mandrel 11. The mandrel 11 is disassembled in a reversed order of assembling of the mandrel 11. Therefore, the first segment 20 is drawn from between the second segments 30.

To this end, as shown in FIG. 2B, the normal-line direction of the side surfaces 22 of the first segment 20 is inclined in the upward direction toward the obverse surface 21 (arrow Ar2 direction of FIG. 2B). The fact that the normal-line direction of the side surfaces 22 of the first segment 20 is inclined in the upward direction means that the side surfaces 22 are inclined to face in the upward direction. In other words, the side surfaces 22 are inclined such that an edge of the side surface 22 on the reverse side is outward relative to an edge thereof on the obverse side. The inclined side surfaces 22 form "draft" in the both side surfaces 22 of the first segment 20. Therefore, the first segment 20 is drawn out easily from between the second segments 30, and thus, the mandrel 11 is disassembled easily.

The inclination angle (draft angle) of the side surface 22 is not particularly limited. A suitable angle is set according to specific shapes or dimensions, etc., of the mandrel 11 and the mold 10. For example, in the present embodiment, the inclination angle (draft angle) of the side surface 22 is set to 8 to 12 degrees, preferably about 10 degrees. The side surfaces 22 facing each other may be inclined at an equal angle or different angles.

As shown in FIGS. 2A and 2B, on an end surface 23 of the first segment 20, there are provided male fastener members 251 for fastening the end surface 23 to a fastening surface (described later) of the support ring 40a (40b), and a male guide member 252 used for positioning fastener members when the first segment 20 is fastened. The male fastener members 251, female fastener members, and a fastened state retaining member (described later), which are provided on the fastening surface of the support ring 40a (40b), constitute an annular fastening/retaining mechanism. In addition, the male guide member 252, and a female guide member (described later) provided on the fastening surface of the support ring 40a (40b) constitute an annular fastening/guide mechanism.

The two male fastener members 251 are provided on the end surface 23. The male guide member 252 is positioned between the male fastener members 251. As shown in FIG. 2B, the male guide member 252 is positioned on a center line (two-dotted line in FIG. 2B) dividing the end surface 23 in a longitudinal direction in FIG. 2B (vertical direction in the state where the first segment 20 is placed horizontally). Therefore, the male fastener members 251 are positioned at an equal distance from the center line. The male guide member 252 is positioned closer to the obverse surface 21 than the male fastener member 251. This is because the male guide member 252 and the female guide member constituting the annular fastening/guide mechanism are brought into contact with each other firstly to position the fastener members constituting the annular fastening/retaining mechanism, when the first segment 20 is lifted up with the obverse surface 21 being on the upper side and fastened to the support ring 40a (40b).

As shown in FIG. 2A, on each of the side surfaces 22 of the first segment 20, there are provided a plurality of (five in FIG. 2A) male joining members 261, a plurality of outer peripheral female guide members 262, joining wedge members and inner peripheral male guide members, which are not shown in FIG. 2A. The male joining members 261 are positioned on the reverse side of the first segment 20, while the outer peripheral female guide members 262 are positioned adjacent to the male joining members 261 and closer to the obverse surface 21 than the male joining members 261. Joining wedge members are provided on the side surface 22 inward relative to the male joining members 261, and protrude outward of the side surface 22 when the first segment 20 is joined to the second segment 30, as described later. The inner peripheral male guide members are provided integrally with the underside of the male joining members 261, although not shown in FIG. 2A.

The male joining members 261, the joining wedge members, and the female joining members (described later) provided on the side surface of the second segment 30 constitute a segment joining/retaining mechanism. The outer peripheral female guide members 262 and outer peripheral male guide members (described later) provided on the side surface of the second segment 30 constitute a segment joining/guide mechanism. In the same manner, the inner peripheral male guide members and inner peripheral female guide members (described later) provided on the side surface of the second segment 30 constitute a segment joining/guide mechanism. In FIG. 2B, to make clear the positional relationship between the side surfaces 22, the male joining members 261, the outer peripheral female guide members 262, the inner peripheral male guide members, and the joining wedge members are not shown.

The male joining member 261 and the outer peripheral female guide member 262 have a positional relationship in which the outer peripheral female guide member 262 is located at the upper side (obverse surface 21 side) and the male joining member 261 is located at the lower side (reverse surface side) in the longitudinal direction in FIG. 2A (vertical direction in the state where the first segment 20 is placed horizontally). This is because, as in the case of the annular fastening/retaining mechanism, the segment joining/guide mechanism positions the segment joining/retaining mechanism, when the first segment 20 is lifted up, is inserted between the second segments 30, and they are joined together.

As will be described later, the inner peripheral male guide member is positioned under (on reverse surface side of) the male joining member 261 in FIG. 2A. It is important to position the side surfaces of the segments 20, 30 when they are joined together, because the mandrel 11 of a substantially cylindrical shape defined by the first segments 20 and the second segments 30 is required to have a smooth outer peripheral surface which is a circumferential surface. That is, when the side surfaces of the segments 20, 30 are joined together, the outer peripheral female guide members 262 and the outer peripheral male guide members perform positioning at the outer peripheral side, while the inner peripheral male guide members and the inner peripheral female guide members perform positioning at the inner peripheral side. This makes it possible to form the smooth circumferential surface while lessening unevenness on the outer peripheral surface of the mandrel 11.

Specific configuration, fastening method, joining method and guide method of the annular fastening/retaining mechanism, the annular fastening/guide mechanism, the segment joining/retaining mechanism, and the segment joining/guide mechanism, will be described later along with an assembling method of the mandrel 11. In the present embodiment, as described later, a clamp member provided on the side surface 22 is included in the segment joining/retaining mechanism. The clamp member will also be described later along with the assembling method of the mandrel 11. The obverse surface 21 of the first segment 20 is configured to allow the stringer to be attached thereto, although not shown in the drawings.

As shown in FIG. 3A, the second segment 30 entirely has a rectangular plate shape, an obverse surface 31 thereof is a convex-like curved surface (convex-shaped surface or convex-curved surface), and side surfaces 32 face a direction which is inclined downwardly with respect to the horizontal direction, in a state in which the second segment 30 is placed horizontally with the obverse surface 31 being on an upper side. That is, the side surfaces 32 are inclined such that the width of the second segment 30 increases from the reverse side toward the obverse surface 31.

As described later, in the present embodiment, when the mandrel 11 is assembled in a cylindrical shape, the second segments 30 are fastened to the support rings 40a, 40b, and then the first segment 20 is fitted between the second segments 30. Therefore, the second segment 30 fastened first preferably has a smaller area at its reverse side so that fitting of the first segment 20 is not precluded. To this end, the normal-line direction of the side surface 32 of the second segment 30 faces in a downward direction (arrow Ar3 direction of FIG. 3B), i.e., the side surface 32 is inclined in the downward direction.

Each of the side surfaces 32 of the second segment 30 has a shape in which an edge portion connected to the obverse surface 31 has an eave portion 37 protruding outward relative to the corresponding side surface 32. Therefore, as shown in FIGS. 3A and 3B, when the second segment 30 is seen from the obverse surface 31, the side surface 32 facing downward is completely hidden by the eave portion 37.

Since the second segment 30 is provided with the cave portions 37 on the side surfaces 32, the obverse surface 31 (surface which becomes the outer peripheral surface of the mandrel 11 when the mandrel 11 is constructed) of the second segment 30 has a greater area than the obverse surface 21 of the first segment 20. Therefore, as described later, all of the second segments 30 having the obverse surfaces 31 with a greater area are fastened to the support rings 40a, 40b, and then the first segments 20 having the obverse surfaces 21 with a smaller area are sequentially fastened to the support rings 40a, 40b. Therefore, the mandrel 11 is assembled in such a manner that a segment (first segment 20) having a smaller area which is easily controlled in attitude and position is filled between segments (second segments 30) with a greater area. This allows the individual segments 20, 30 to be positioned easily and with higher accuracy. This makes it possible to assemble the mandrel 11 easily and allows the outer peripheral surface of the assembled mandrel 11 to have a smooth peripheral surface with a minimum level difference.

The second segment 30 is provided on each of the side surfaces 32 below the eave portion 37, with a female joining member (as described later) constituting the segment joining/retaining mechanism, and the outer peripheral male guide member and the inner peripheral female guide member constituting the segment joining/guide mechanism. In FIG. 3B, to easily describe the positional relationship between the side surfaces 32, the female joining member, the outer peripheral male guide member, and the inner peripheral female guide member are not shown. These will be described later along with the assembling method of the mandrel 11.

The degree to which the side surface 32 is inclined downward, and the degree to which the eave portion 37 protrudes outward are not particularly limited. They are suitably set based on the specific configuration of the mandrel 11, the specific configuration of the second segment 30, or the specific configuration of the first segment 20 joined to the second segment 30.

Like the end surface 23 of the first segment 20, on an end surface 33 of the second segment 30, two male fastener members 351 for fastening the end surface 33 to a fastening surface of the support ring 40a (40b) and one male guide member 352 are provided to have the same positional relationship as that between the male fastener members 251 and the male guide member 252. Like the male fastener members 251, the male fastener members 351 constitute the annular fastening/retaining mechanism, while the male guide members 352 constitute the annular fastening/guide mechanism like the male guide members 252.

As shown in FIG. 3A, the second segment 30 has a door frame portion 15a and window frame portions 15b. The door frame portion 15a corresponds to a door in the OPB formed using the mold 10 of the present embodiment, while the window frame portions 15b correspond to windows in the OPB. The door frame portion 15a and the window frame portions 15b are concave-convex portions used for cutting and perforation in a trimming process. Although in the present embodiment, the door frame portion 15a and the window frame portions 15b are formed on the obverse surface 31 of the second segment 30, the present invention is not limited to this. The door frame portion 15a and the window frame portions 15b may be formed on the obverse surface 21 of the first segment 20 or on both of the first segment 20 and the second segment 30. Although not shown, the stringer is attachable on the obverse surface 31 of the second segment 30.

[Configuration of Support Ring]

Figure 4A:
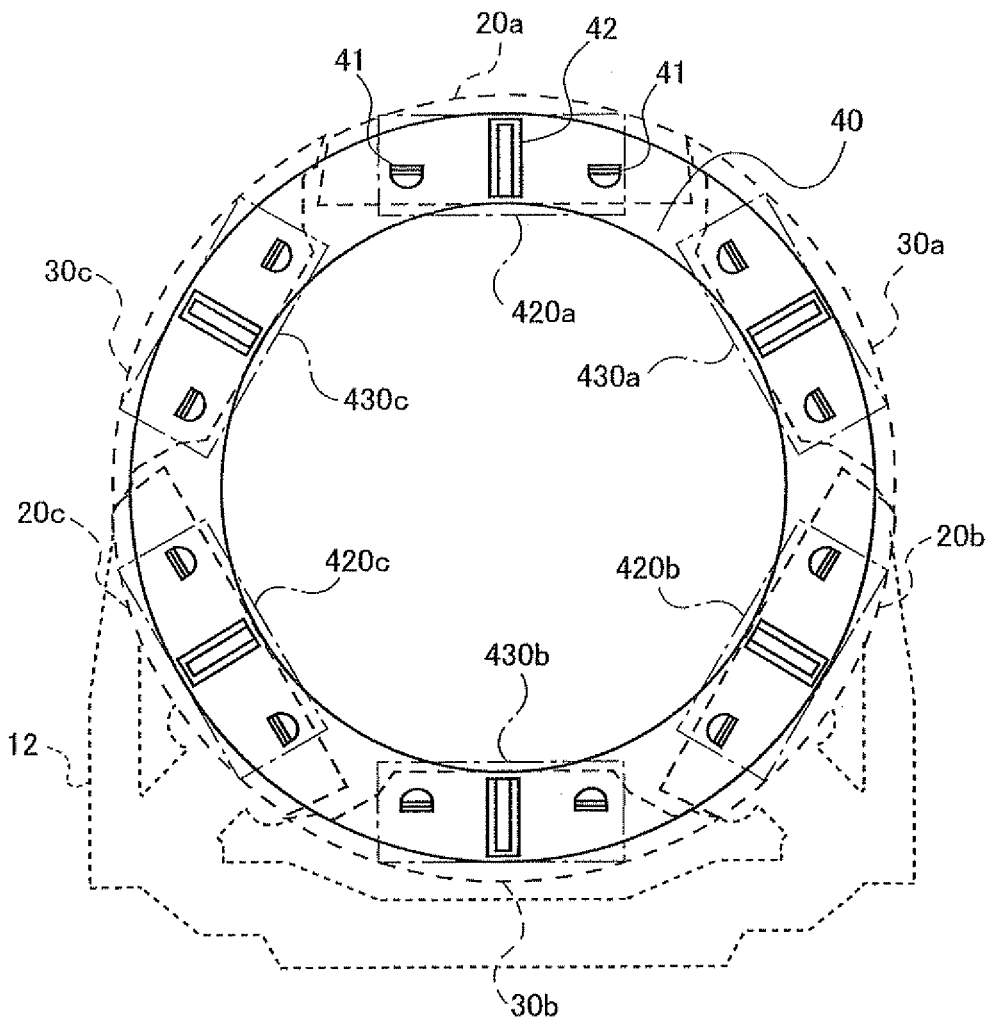
FIG. 4A is a plan view showing an example of the configuration of a support ring supporting the mandrel of FIG. 1 at both ends.
Figure 4B:
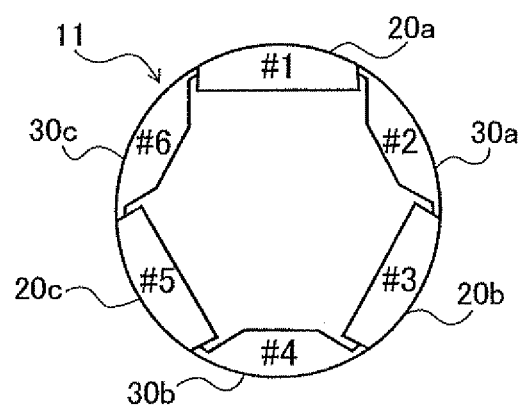
FIG. 4B is a schematic end view of the mandrel showing a positional relationship between segments retained by the support ring of FIG. 4A.

Next, a description will be given of the configuration of the support rings 40a, 40b which are retaining members for retaining the segments 20, 30 as the single cylindrical mandrel 11, and a positional relationship of fastening portions of the support rings 40a, 40b, to which the segments 20, 30 are fastened, with reference to FIGS. 4A and 4b. FIG. 4A is a plan view showing an example of the support rings 40a, 40b supporting the mandrel 11 at both ends, and FIG. 4B is a schematic end view of the mandrel 11 showing a positional relationship between segments 20, 30 retained in the cylindrical shape by the support rings 40a, 40b.

In description below, with reference to FIG. 4A, the support rings 40a, 40b having substantially the same configuration are collectively referred to as "support ring 40." In the same manner, the cradles 12a, 12b for supporting the support rings 40 are collectively referred to as "cradle 12."

As shown in FIG. 1, the support rings 40a, 40b for supporting the mandrel 11 configured as described above have an oval annular shape. The support rings 40a, 40b are positioned to face to each other, and are supported by cradles 12a, 12b in an upright position. As shown in FIG. 4A, opposing surfaces of the support rings 40a, 40b are fastening surfaces 43 for fastening the end surfaces of the mandrel 11. In FIG. 4A, the outline of the cradle 12 is indicated by a dotted line.

As shown in FIG. 4A, the fastening surface 43 is provided with first fastening portions 420a to 420c which are locations to which the first segments 20a to 20c are fastened, respectively, and second fastening portions 430a to 430c which are locations to which the second segments 30a to 30c are fastened, respectively (regions indicated by dotted lines in FIG. 4A). The first fastening portions 420a to 420c and the second fastening portions 430a to 430c are set such that the first fastening portion and the second fastening portion are arranged alternately along the circumferential direction of the fastening surface 43. In each fastening portion, two female fastener members 41 and one female guide member 42 between them are provided.

The end surface 23 of the first segment 20a is fastened to the first fastening portion 420a, the end surface 23 of the first segment 20b is fastened to the first fastening portion 420b, and the end surface 23 of the first segment 20c is fastened to the first fastening portion 420c. In the same manner, the end surface 33 of the second segment 30a is fastened to the second fastening portion 430a, the end surface 33 of the second segment 30b is fastened to the second fastening portion 430b, and the end surface 33 of the second segment 30c is fastened to the second fastening portion 430c. In this way, the specified fastening portions are provided in the fastening surface 43 of the support ring 40 to fasten the specified segments 20, 30 to it.

The female fastener members 41 are members into which the male fastener members 251 of each of the first segments 20a to 20c constituting the mandrel 11 or the male fastener members 351 of each of the second segments 30a to 30c constituting the mandrel 11 are inserted to fasten each of the first segments 20a to 20c or each of the second segments 30a to 30c to the fastening surface 43 of the support ring 40. The female fastener members 41, and the male fastener members 251, 351, constitute the annular fastening/retaining mechanism. Although not shown in FIG. 4A, fastening wedge members as a fastened state retaining member for retaining the above fastened state are provided on the fastening surface 43.

The female guide member 42 is a member into which the male guide member 252 of each of the first segments 20a to 20c or the male guide member 352 of each of the second segments 30a to 30c is inserted, to guide the male fastener member 251 (351) to be inserted into the female fastener member 41. The female guide member 42 and the male guide members 252, 352 constitute the annular fastening/guide mechanism. For example, as shown in FIG. 4A, the female guide member 42 is a pair of rail-like members extending radially from a center side toward outside of the support ring 40a (40b). The inner end portion of the support ring 40 is open between the rails, while the outer end portion thereof is closed between the rails. The male guide member 252 (352) is inserted into a recess portion between the rails to serve as the annular fastening/guide mechanism.

The positions of the female fastener members 41 on the fastening surface 43 correspond to the male fastener members 251, 351 provided on the end surfaces 23 of the first segments 20a to 20c and on the end surfaces 33 of the second segments 30a to 30c. For example, the male fastener members 251 of each of the first segments 20a to 20c are positioned at an equal distance from the male guide member 252 positioned on the center line of the end surface 23. Therefore, on the fastening surface 43, two female fastener members 41 are positioned at an equal distance from the female guide member 42 on the center line.

The support ring 40 is provided with a flanged rotary gear section (not shown) on the outer periphery of a surface (outer surface 44) which is on an opposite side of the fastening surface 43. The rotary gear section will be described along with the precision rails.

The mandrel 11 is constructed and retained in such a manner that the segments 20, 30 are fastened to the support ring 40 having the above configuration, and has a structure in which the first segment 20 and the second segment 30 are arranged alternately as shown in FIG. 4B.

In the present embodiment, the relation between the order in which the segments 20, 30 are fastened and the positions of the segments 20, 30 retained as the mandrel 11 is important. Therefore, the segments 20, 30 constituting the mandrel 11 are assumed as a part (section) of the mandrel 11 and are identified by ordinal numbers. As shown in FIG. 4B, on the basis of the first segment 20a located at the uppermost side, the ordinal numbers are assigned to the segments 20, 30, in a clockwise direction (rightward), and are identified as "location numbers" indicating the positions of the segments 20, 30 when they are assembled as the mandrel 11.

Specifically, as shown in FIG. 4B, the first segment 20a at the uppermost side is "segment of #1," the second segment 30a is "segment of #2," the first segment 20b is "segment of #3," the second segment 30b is "segment of #4," the first segment 20c is "segment of #5," and the second segment 30c is "segment of #6."

[Configuration of Precision Rail]

Figure 5:
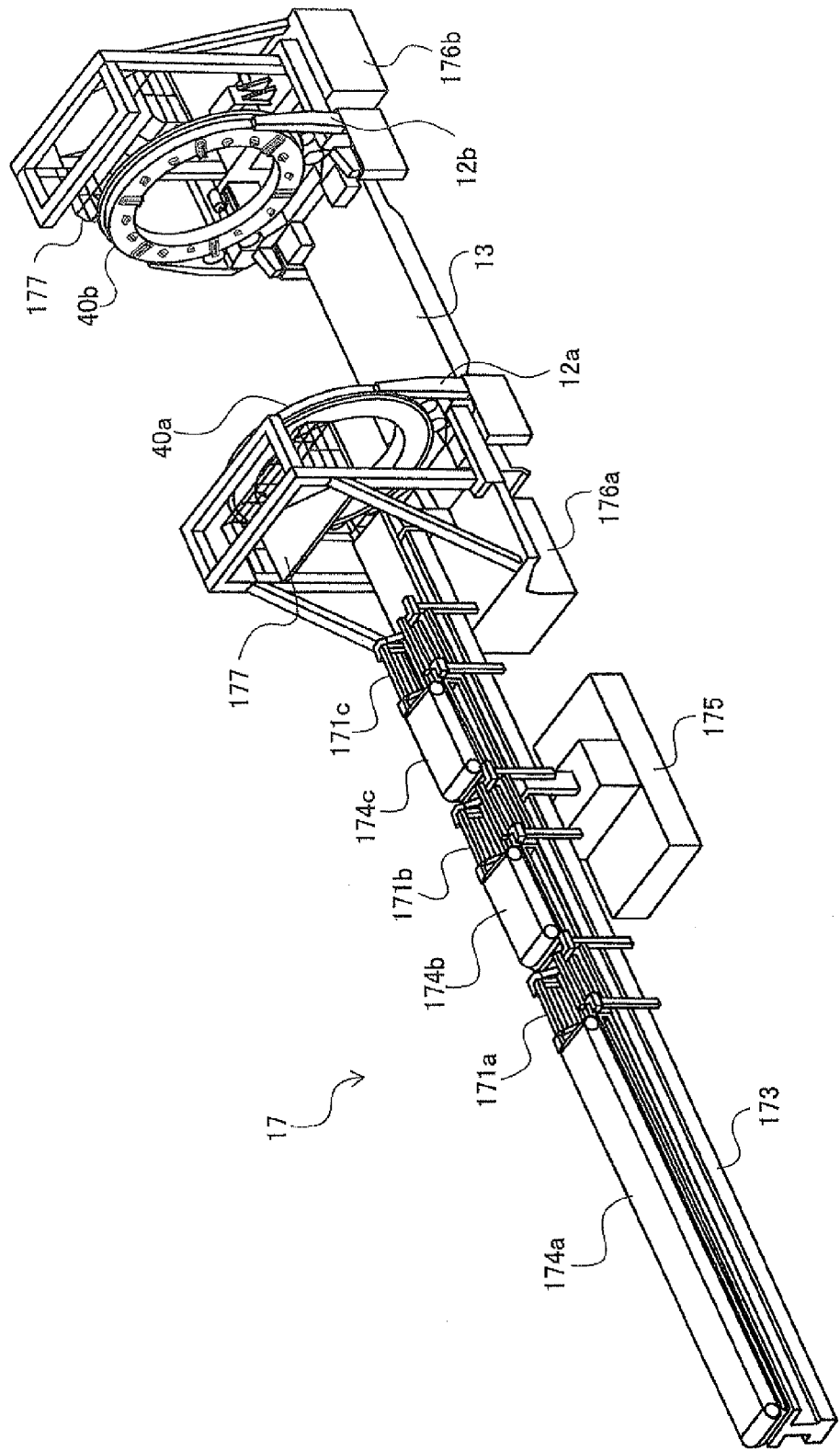
[FIG. 5]
Figure 6A:
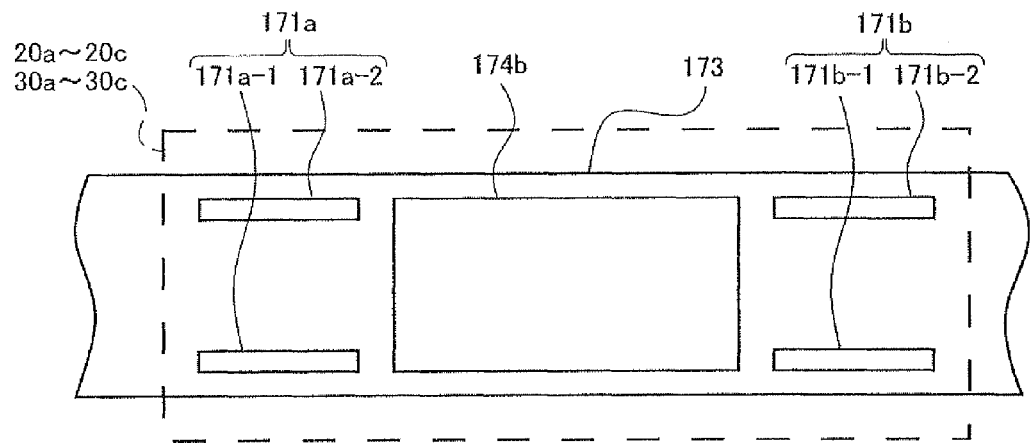
FIG. 6A is a schematic plan view showing a state in which the segment is placed on the precision rail of FIG. 5.
Figure 6B:
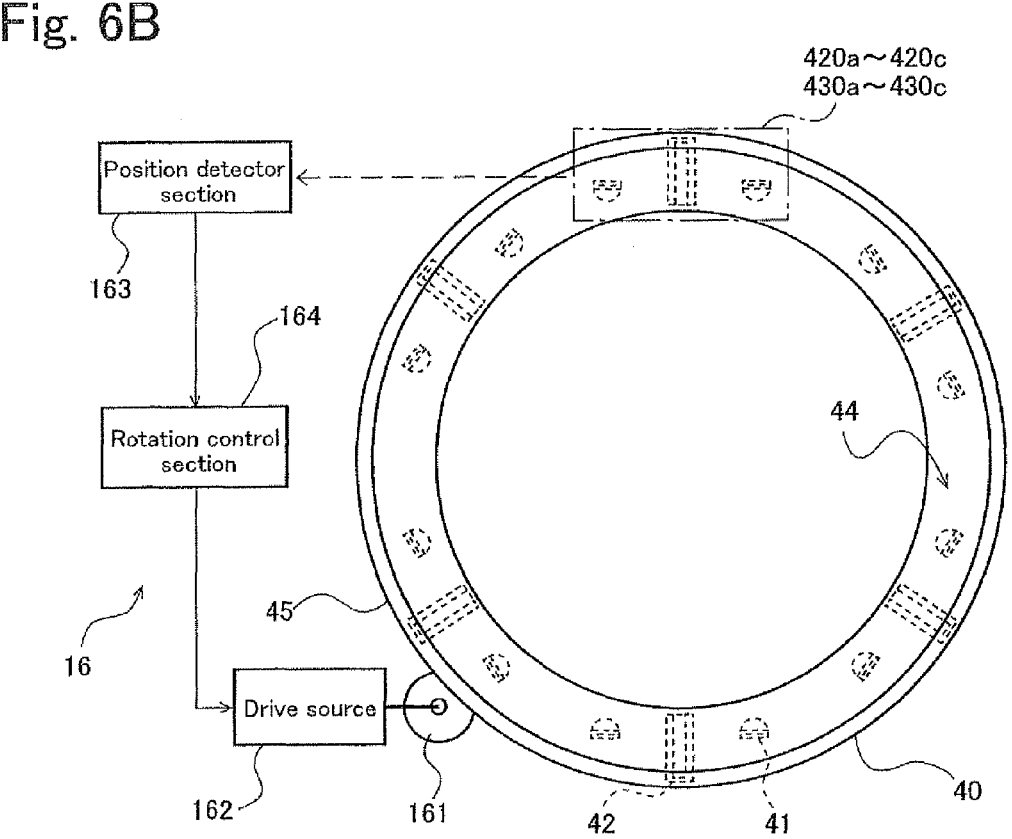
FIG. 6B is a block diagram showing a schematic configuration of a ring rotation drive section included in the precision rail of FIG. 5.

Next, a description will be given of a specific configuration of the precision rail, which is the assembling apparatus for assembling the segments 20, 30 into the cylindrical mandrel 11, with reference to FIGS. 5, and FIGS. 6A and 6B. FIG. 5 is a perspective view showing an example of the overall configuration of the precision rail. FIG. 6A is a schematic plan view showing a state in which the segment is placed on the precision rail of FIG. 5, and FIG. 6B is a block diagram showing a schematic configuration of the ring rotation drive section included in the precision rail of FIG. 5.

As shown in FIG. 5, the precision rail 17 for use in the present embodiment includes a rail body 173, a rail movement support table 175, and a pair of rail support work tables 176a, 176b. The rail body 173 is a single rail member supported on the rail movement support table 175 such that the rail body 173 is movable along its lengthwise direction. On the upper surface of the rail body 173, jack sections 171a, 171b, and 171c, and conveyor sections 174a, 174b, and 174c are provided.

The rail movement support table 175 and the rail support work table 176a support the rail body 173 such that the rail body 173 is movable. In the present embodiment, a clip or scissor-shaped movement support mechanism is provided on a base to support the rail body 173 such that the rail body 173 is movable, although not shown. The movement support mechanism is opened rightward and leftward when the rail body 173 moves. During a stopped state of the rail body 173, the movement support mechanism is closed to sandwich the rail body 173.

The rail support work tables 176a, 176b are positioned to face each other such that the carriage 13 is interposed between them. On the rail support work tables 176a, 176b, upside work tables 177 are provided, respectively. For easier explanation, although not shown, winding steps are provided from a floor surface to the upside work tables 177. Although not shown clearly, under the rail support work table 176a, a movement support mechanism is provided like the rail movement support table 175, and a ring rotation drive section for rotating the support ring 40a is provided. In addition, although not shown clearly, under the rail support work table 176b, a stop support mechanism is provided to support the rail body 173 such that the rail body 173 does not move beyond the location of the rail support work table 176b, and a ring rotation drive section for rotating the support ring 40b is provided.

The support rings 40a, 40b are supported by the cradles 12a, 12b, respectively and by the rail support work tables 176a, 176b, respectively. To be specific, the cradle 12a (12b) supports the support ring 40a (40b) from below by arms sections 121 at least two locations sandwiching a vertical line passing through a center axis of the support ring 40a (40b) and is applied with a rotational force from the ring rotation drive section via the support rollers 123 (see FIG. 1). The rail support work tables 176a, 176b restrict axial movement of the support rings 40a, 40b, on the upper portions of the support rings 40a, 40b (see FIG. 5). In this way, since the support rings 40a, 40b are supported at the upper portion and the lower portion, the support rings 40a, 40b can be rotated while preventing them from falling.

The support rings 40a, 40b are placed on the carriage 13 disposed between the rail support work tables 176a, 176b, via the cradles 12a, 12b . The support ring 40a is supported by the rail support work table 176a and the carriage 13. In this state, the upside work table 177 is positioned to face an upward direction of the support ring 40a. In the same manner, the support ring 40b is supported by the rail support work table 176b and the carriage 13. In this state, the upside work table 177 is positioned to face an upward direction of the support ring 40b.

As described later, the first segments 20a to 20c and the second segments 30a to 30c are fastened to the support rings 40a, 40b, to assemble the cylindrical mandrel 11 in the cylindrical shape. The rail body 173 is movable along its lengthwise direction such that it is inserted into inside of the mandrel 11 (or hollow space of the support rings 40a, 40h) or drawn out of the inside (hollow space). Therefore, as shown in FIG. 5, in a state where the rail body 173 is drawn out of the inside, the rail body 173 and the support rings 40a, 40b are arranged in one line such that its tip end faces the hollow space of the support ring 40a.

in description below, the movement of the rail body 173 is defined as follows. When the rail body 173 is inserted into the hollow space of the support rings 40a, 40b or the inside of the mandrel 11, this movement is referred to as "forward movement," while when the rail body 173 is drawn out of the hollow space of the support rings 40a, 40b or the inside of the mandrel 11, this movement is referred to as "backward movement."

As shown in FIG. 5, the three jack sections 171a to 171c and the three conveyor sections 174a to 174c provided on the upper surface of the rail body 173 are arranged in such a way that the conveyor section 174a, the jack section 171a, the conveyor section 174b, the jack section 171b, the conveyor section 174c, and the jack section 171c are aligned from a rear end side of the rail body 173. The specific configuration of the jack sections 171a to 171e and the conveyor sections 174a to 174c is not particularly limited, but a known configuration can be suitably used.

in the present embodiment, the jack sections 171a to 171c have a substantially equal dimension and substantially the same configuration. The jack sections 171a to 171c are each configured to move in an upward direction an object placed thereon. Among the conveyor sections 174a to 174c, the conveyor section 174a at the rearmost side has a greater length in a conveying direction than the conveyor sections 174b, 174c.

As described later, the conveyor section 174a is configured to convey each of the first segments 20a to 20c or each of the second segments 30a to 30c placed thereon, toward the tip end. Therefore, the length of the conveyor section 174a in the conveying direction is set greater than a lengthwise dimension of each of the first segments 20a to 20c or each of the second segments 30a to 30c . The conveyor section 174b is positioned between the jack sections 171a, 171b, while the conveyor section 174c is positioned between the jack sections 171b, 171c . The conveyor sections 174b, 174c precisely adjust the position of each of the first segments 20a to 20c or each of the second segments 30a to 30e moved onto two of the jack sections 171a to 171c.

Among the three the jack sections 171a to 171c, the jack sections 171a, 171b are used to primarily lift up each of the first segments 20a to 20c or each of the second segments 30a to 30c up to a location above the support rings 40a, 40b . In description of the jack sections 171a, 171b, the first segments 20a to 20c or the second segments 30a to 30c are referred to as the first segment 20 or the second segment 30, respectively.

To be specific, the first segment 20 or the second segment 30 placed on the rail body 173 is moved horizontally toward the tip end by the conveyor section 174a at the rearmost side, to a location covering the upper surfaces of the jack section 171a, the conveyor section 174b, and the jack section 171b, as shown in FIG. 6A. Each of the jack sections 171a to 171c includes a pair of support rod members to support the segment 20 (30). In an example shown in FIG. 6A, the jack section 171a includes support rod members 171a-1, 171a-2, while the jack section 171b includes support rod members 171b-1, 171b-2. The support rod members are provided on the upper surface of the rail body 173 such that they are parallel to the lengthwise direction of the rail body 173 and face to sandwich a center portion in a cross-sectional direction of the rail body 173.

In this state, on the lower surface of the first segment 20 or the second segment 30 having a substantially rectangular shape, the support rod members 171a-1, 171a-2, and the support rod members 171b-1, 171b-2 are placed in locations which are in the vicinity of the four corners of the lower surface of the first segment 20 or the second segment 30, and the conveyor section 174b is disposed between the support rod members 171a-1, 171a-2, and the support rod members 171b-1, 171b-2. Therefore, the jack sections 171a, 171b can lift up the first segment 20 or the second segment 30 while changing the positions of the four corners. This allows the first segment 20 or the second segment 30 to be fastened to the support rings 40a, 40b with high position accuracy, as described later.

The support rings 40a, 40b to which the first segment 20 or the second segment 30 is fastened are rotatable. As a configuration for rotating the support rings 40a, 40b, as described later, the ring rotation drive section is provided below the rail support work tables 176a, 176b. In description of the ring rotation drive section, below, the support rings 40a, 40b are referred to as the support ring 40.

As shown in FIG. 6B, a ring rotation drive section 16 includes a drive gear 161 in mesh with a rotary gear section 45 provided on the outer periphery of the support ring 40, a drive source 162 which includes a motor, a gear, etc., and rotates the drive gear 161, a position detector section 163 which detects whether or not each of the first fastening portions 420a to 420c or each of the second fastening portions 430a to 430c is located at the uppermost portion of the support ring 40, and a rotation control section 164 for controlling these constituents. As the position detector section 163, a known sensor is used. As the rotation control section 164, a processor such as a CPU is used.

A specific configuration for detecting the position by the position detector section 163 is not particularly limited. In the present embodiment, the position detector section 163 detects a detected portion (not shown) provided on the support ring 40. In the configuration shown in FIG. 6B, the position detector section 163 detects that the specified fastening portion is positioned at the uppermost portion of the support ring 40, and therefore the detected portion is provided on the specified fastening portion. The specific configuration of the position detector section 163 is not limited, so long as the position detector section 163 is capable of detecting that the specified fastening portion has reached a predetermined detection position by the rotation of the support ring 40. For example, the detected portion may be positioned below the support ring 40, when the specified fastening portion is positioned at the uppermost portion of the support ring 40. This allows the ring rotation drive section 16 to be configured compactly. The detected portion may be an optical, mechanical, or physical configuration.

The ring rotation drive section 16 causes the support ring 40 to rotate, thereby allowing the segment 20 (30) to be lifted up and fastened to the support ring 40 with the same motion, rather than with different motions.

[Assembling Method and Overall Configuration of Mandrel]

Figure 7:
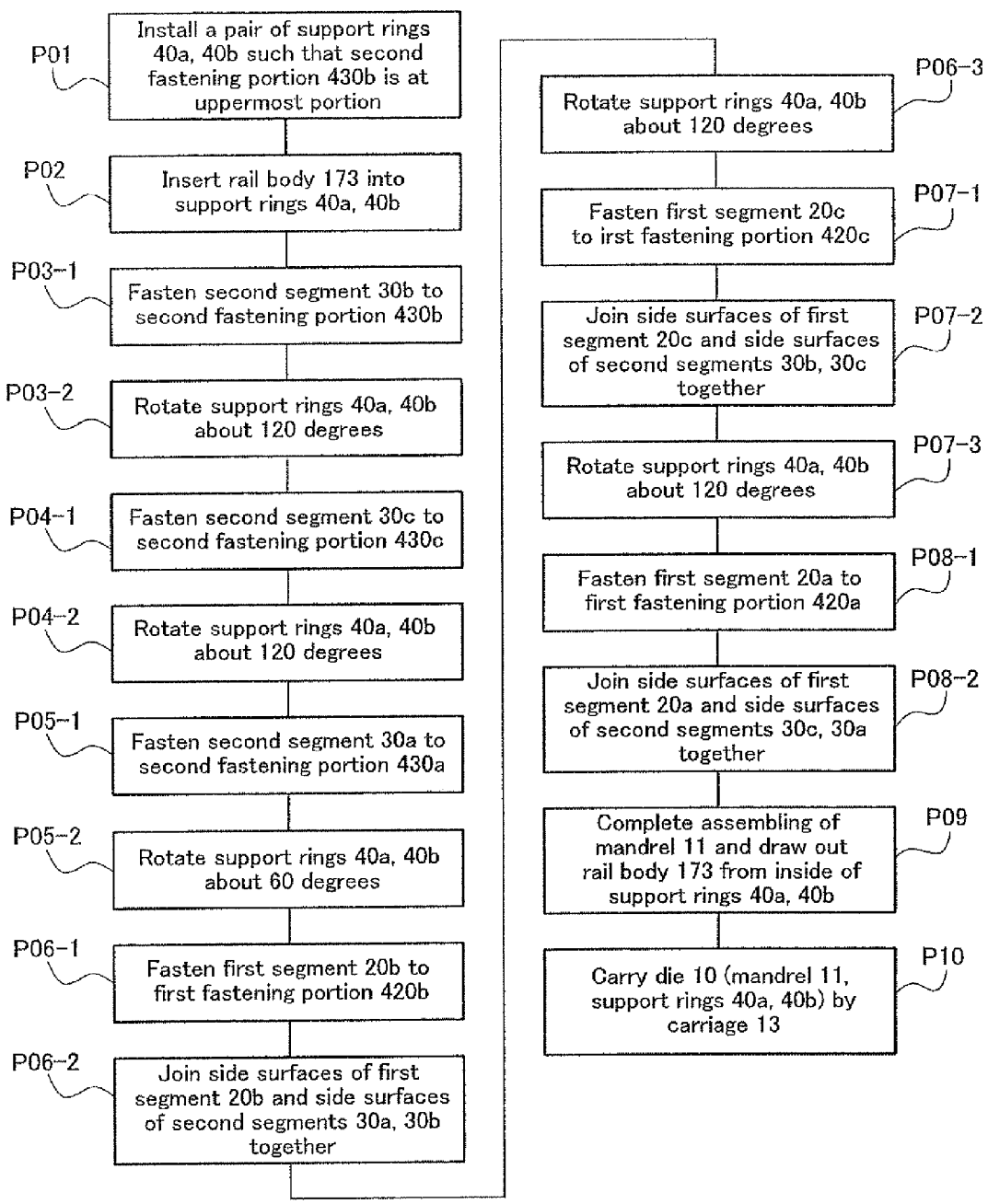
[FIG. 7]

Next, a description will be given of a method of assembling the mandrel 11 in such a manner that six segments 20, 30 to the support rings 40a, 40b one by one, using the above stated precision rail 17. Firstly, the assembling method of the mandrel 11 will be descried with reference to FIG. 7. FIG. 7 is a view of steps showing the overall configuration of the assembling method of the mandrel 11 of FIG. 1.

As shown in FIG. 7, in the present embodiment, the pair of support rings 40a, 40b are installed via the carriage 13 and the cradles 12a, 12b between the rail support work tables 176a, 176b of the precision rail 17 (step P01). At this time, the support rings 40a, 40b are installed such that the second fastening portion 430b is located at the uppermost portions thereof. The support rings 40a, 40b may be rotated to move the second fastening portion 430b up to the uppermost portions thereof.

Next, the rail body 173 is inserted into the hollow space of the support rings 40a, 40b (step P02). In this state, the second segments 30a to 30c can be fastened to the support rings 40a, 40b.

Then, the second segments 30a to 30c are fastened to the second fastening portions 430a to 430c of the support rings 40a, 40b in the order of the second segment 30b, the second segment 30c and the second segment 30a (step P03-1~P05-2). Then, the first segments 20a to 20c are fastened to the first fastening portions 420a to 420c of the support rings 40a, 40b in the order of the first segment 20b, the first segment 20c and the first segment 20a, and the side surfaces 22 of the first segments 20a to 20c are joined to the side surfaces 32 of the second segments 30a to 30c (step P06-1~P08-2).

When all of the segments are fastened to the support rings 40a, 40b, the mandrel 11 shown in FIG. 1 is assembled. Then, the rail body 173 is drawn out of the inside of the support rings 40a, 40b (step P09). The mold 10 including the mandrel 11 and the support rings 40a, 40b is moved by the carriage 13 (step P10), and used for molding the composite material structure.

Among the steps, step P03-1, step P04-1, step P05-1, step P06-1, step P07-1, and step P08-1, are referred to as a segment fastening step, and step P03-2, step P04-2, step P05-2, step P06-3, and step P07-3, are referred to as a rotation step. Also, step P06-2, step P07-2, and step P08-2, are referred to as a segment joining step, step P01 is referred to as a support ring installation step, step P02 is referred to as a rail insertion step, and step P09 is referred to as rail drawing step. The segment fastening step can be divided into step P06-1, step P07-1, and step P08-1 which are the first segment fastening step, and step P03-1, step P04-1, and step P05-1 which are the second segment fastening step.

As described above, in the assembling method of the present embodiment, the second segments 30a to 30e are fastened to the support rings 40a, 40b, one by one, and the first segments 20a to 20c are fastened between the second segments 30a to 30c one by one. Next, a description will be given of a fastening method and a fastening work of the second segments 30a to 30c, with reference to FIGS. 8 to 15.

[Assembling Method of Mandrel and Fastening of Second Segment]

In the present embodiment, the second segments 30a to 30c are fastened to the second fastening portions 430a to 430c the support rings 40a, 40b, one by one, in the order of the second segment 30b, the second segment 30c and the second segment 30c, as shown in FIG. 7. Hereinafter, a description will be given of how the second segments 30 are fastened in conjunction with the location numbers assigned to the segments 20, 30 shown in FIG. 4B.

Figure 8:
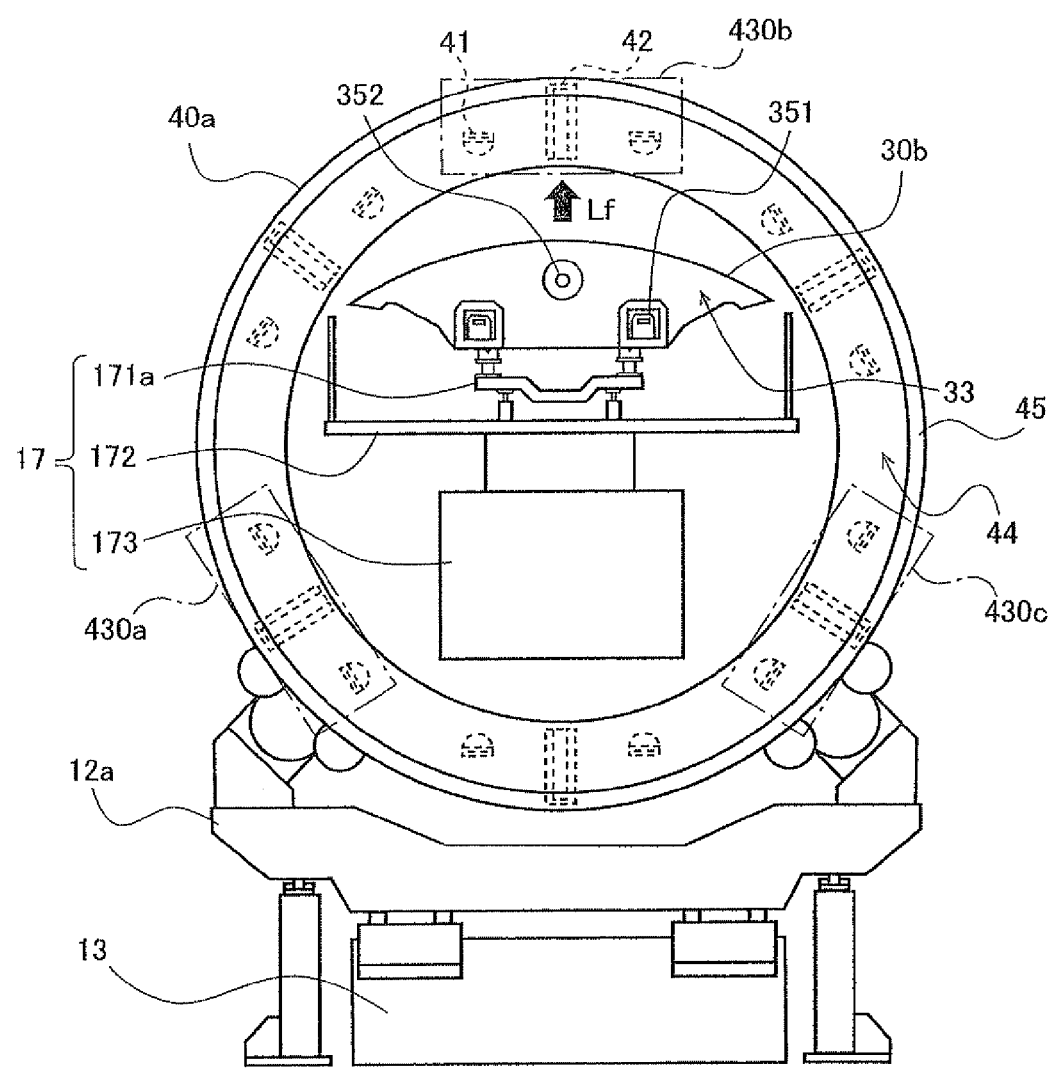
[FIG. 8]
Figure 10A:
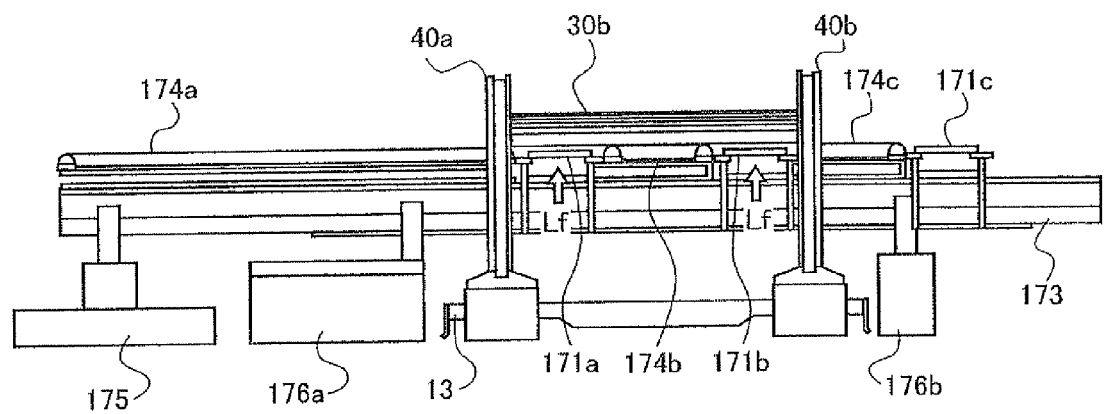
FIGS. 10A and 10B are side views of the precision rail showing the operation of the precision rail, which follows the operation of FIG. 9B.
Figure 10B:
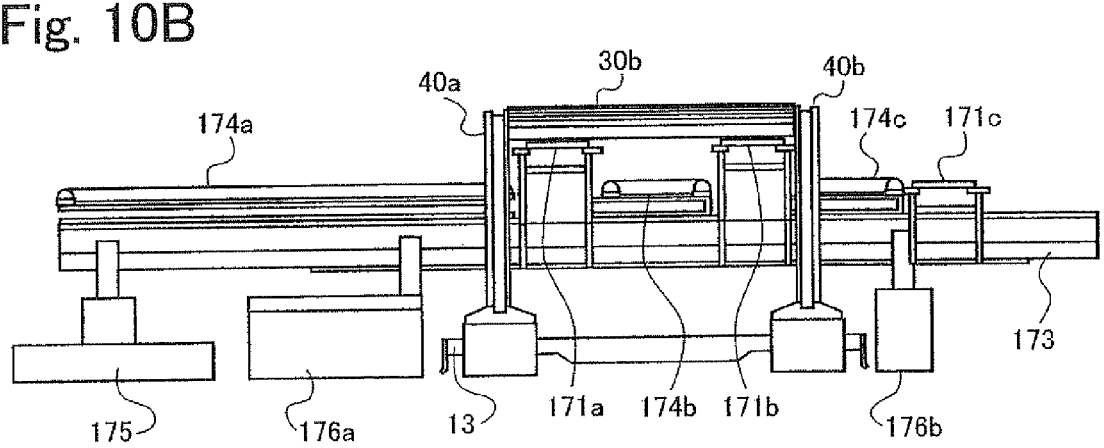
Figure 11:
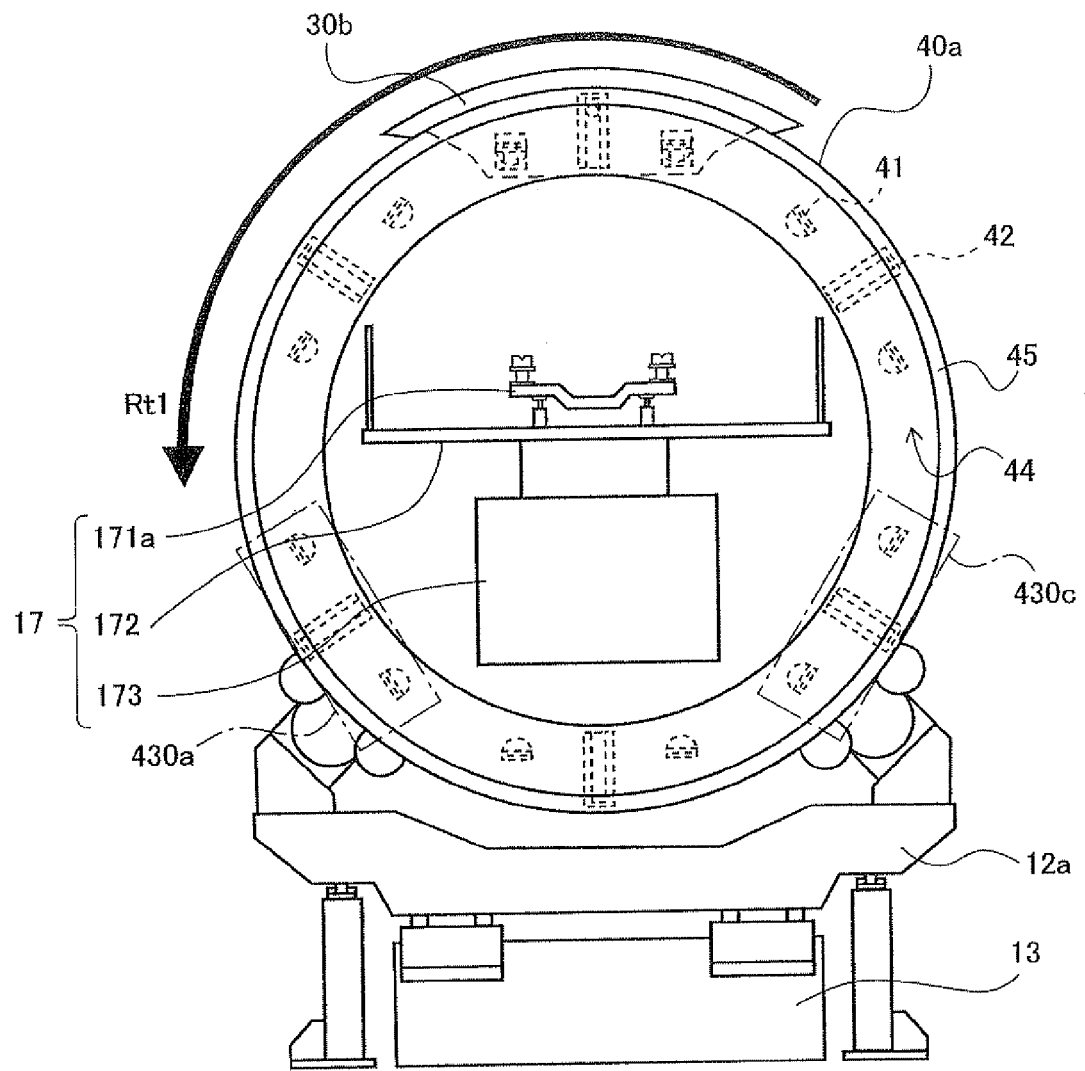
[FIG. 11]

FIG. 8 is a schematic view (view seen from the support ring 40a side) showing a state in which the second segment 30b of #4 is placed on the jack section 171a (and jack section 171b) to lift it in the 12 o'clock direction (vertically upward direction) and fasten it to the support ring 40a (and support ring 40b). FIGS. 9A and 9B are side views of the precision rail 17 showing the operation of the precision rail 17 when the second segment 30b is lifted up and fastened to the support ring 40a. FIGS. 10A and 10B are side views of the precision rail 17 showing the operation of the precision rail 17, which occurs after the operation of FIG. 9B. FIG. 11 is a schematic view showing a state in which the second segment 30b of #4 is fastened to the support ring 40a. FIGS. 12 to 15 are schematic views showing a placed state or fastened state when the second segment 30c of #6 or the second segment 30a of #2 is fastened to the support ring 40a.

In the schematic views showing the state in which the segments 20, 30 are fastened to the support ring 40a, including FIG. 8, a part of the cradle 12a and the carriage 13 are omitted to clearly show the locations in which the segments 20, 30 are fastened onto the support ring 40a. Although the both ends of the segments 20, 30 are fastened to the support rings 40a, 40b, only the support ring 40a (and the cradle 12a supporting the support ring 40a) are shown in the schematic views, to provide easier explanation. Therefore, of course, the support ring 40b is supported by the cradle 12b, and the segments 20, 30 are fastened to the support ring 40b, as in the case of the support ring 40a.

As shown in FIG. 8, the cradle 12a mounted to the carriage 13 supports the support ring 40a and the support ring 40b which is not shown, such that the support rings 40a, 40b stand vertically (step P01 shown in FIG. 7, support ring installation step). Then, the precision rail 17 is installed in a location corresponding to the hollow space of the annular support rings 40a, 40b, when viewed from outer surfaces 44 of the support rings 40a, 40b, between the support rings 40a, 40b. FIG. 8 shows the second fastening portions 430a to 430c of the support ring 40a to which the second segments 30a to 30c are fastened, respectively, while FIGS. 10 to 14 show the second fastening portions 430c, 430a to which the second segments 30a to 30c are not fastened.

The operation of the precision rail 17 which is moved to the position of FIG. 8 will be described. As shown in FIG. 9A, the rail body 173 of the precision rail 17 is not inserted into the hollow space of the support rings 40a, 40b, but is supported on the rail movement support table 175 and the rail support work table 176a in a state where the rail body 173 is completely drawn out of the support rings 40a, 40b. The state shown in FIG. 9A is the overall view of the precision rail 17 of FIG. 5. At this time, the rail body 173 is in a completely retracted position.

In this state, the second segment 30h of #4 is placed on the conveyor section 174a at the rear end side of the rail body 173. As indicated by an arrow Is, the rail body 173 moves forward toward the support rings 40a, 40b (step P02 shown in FIG. 7, rail insertion step).

Then, as shown in FIG. 9B, the rail body 173 of the precision rail 17 is inserted into the hollow space of the support rings 40a, 40b and moves forward up to a terminal end of them. After that, the rail body 173 stops. The rail body 173 is supported on the rail movement support table 175, and the rail support work tables 176a, 176b. Then, as indicated by an arrow Hr of FIG. 9B, the second segment 30b is conveyed and moved horizontally on the rail body 173 by the conveyor section 174a toward the support ring 40a.

Then, as shown in FIG. 10A, the second segment 30b stops between the support rings 40a, 40b. At this time, the conveyor section 174b and the conveyor section 174c may precisely adjust the horizontal position of the second segment 30b. When this state is viewed from the outer surface 44 of the support ring 40a, as shown in FIG. 8, the rail body 173, the jack section 171a, and the second segment 30b are located in this order from below in the hollow space of the support ring 40a. As indicated by an arrow Lf in FIGS. 8 and 10A, the jack section 171a and the jack section 171b start to move up. In this state, as shown in FIG. 8, the second fastening portion 430b is located at the uppermost portion of the support ring 40a (and support ring 40b).

Then, as shown in FIG. 10B, the jack section 171a and the jack section 171b cause the second segment 30b to move in the 12 o'clock direction. At this time, as described above, as shown in FIG. 6A, the up-positions of the portions in the vicinity of the four corners of the second segment 30b can be changed independently by using the support rod members 171a-1, 171a-2, and the support rod members 171b-1, 171b-2.

On the end surface 33 (see FIGS. 3A and 3B) of the second segment 30b, the male fastener members 351 and the male guide member 352 are provided. On the fastening surface 43 (see FIG. 4) of the support ring 40a, the female fastener members 41, the female guide member 42, and the fastening wedge members (not shown) are provided. The male guide member 352 and the female guide member 42 constitute an annular fastening/guide mechanism, while the male fastener members 351, the female fastener members 41 and the fastening wedge members constitute an annular fastening/retaining mechanism.

The annular fastening/retaining mechanism fastens the second segment 30b to the second fastening portion 430b of the support ring 40a (40b) (step P03-1 in FIG. 7, second segment fastening step). When the jack section 171a and the jack section 171b cause the second segment 30b to move up, the annular fastening/guide mechanism guides the second segment 30b being lifted up to the second fastening portion 430b, while the positions of the corner portions are adjusted by the jack section 171a and the jack section 171b. Therefore, the end surface 33 of the second segment 30b can be fastened to the second fastening portion 430b of the support ring 40a (40b) with high accuracy.

Hereinafter, the operation of the annular fastening/guide mechanism and the operation of the annular fastening/retaining mechanism are referred to as "fastening/guide operation," and "fastening/retaining operation," respectively. In the same manner, the position adjustment of the portions in the vicinity of the four corners of the first segments 20a to 20c and the second segments 30a to 30c which are performed by the jack section 171a and the jack section 171b is referred to as "four-corner position adjustment operation."

In FIGS. 8, 11, and other views, an internal work table 172 is provided on the rail body 173 in addition to the jack section 171a. As described later, the internal work table 172 is provided to allow operators to join the first segments 20a to 20c to the second segments 30a to 30c, etc., and is supported on the rail body 173.

Figure 12:
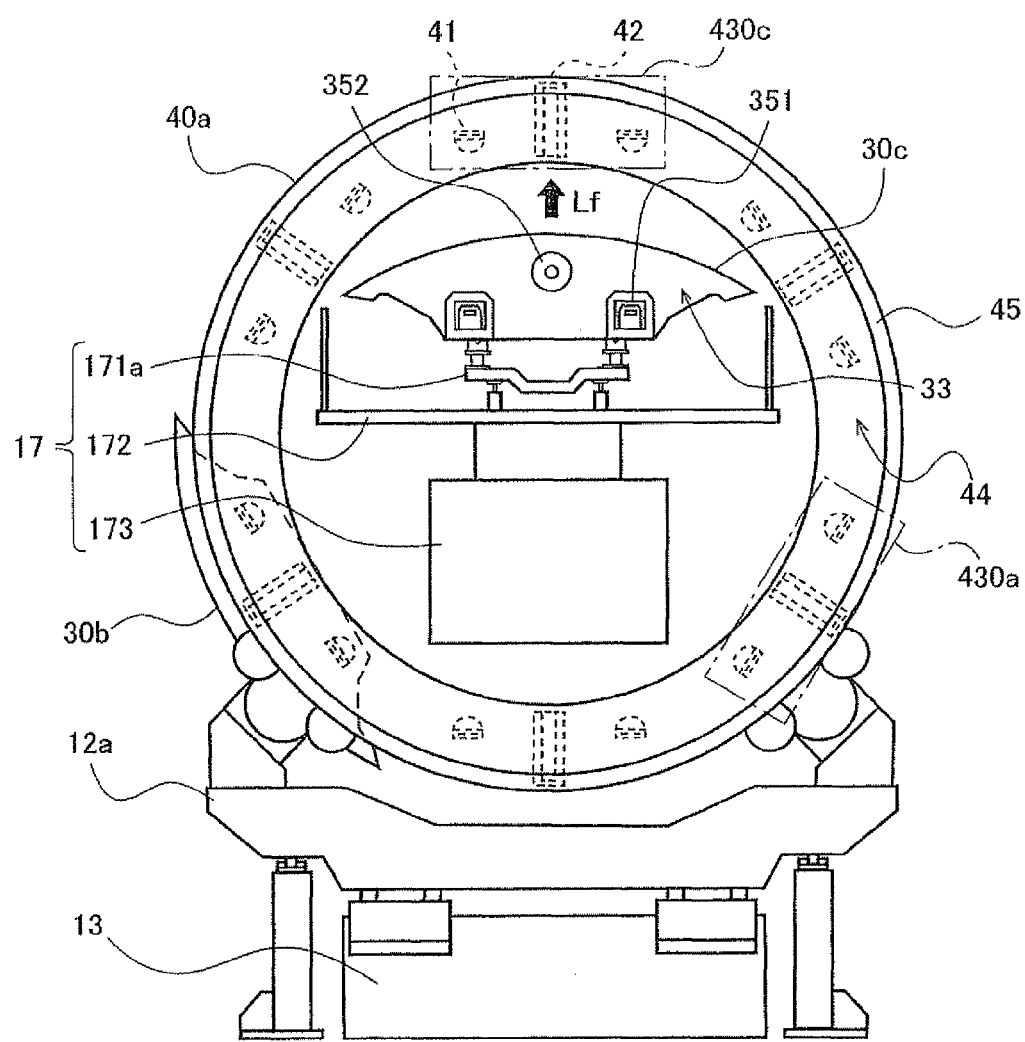
[FIG. 12]

Then, as indicated by the arrow Rt1 of FIG. 11, the support ring 40a (and the support ring 40b which is not shown) is rotated about 120 degrees by the ring rotation drive section 16 (step P03-2 in FIG. 7, rotation step). Thereby, as shown in FIG. 12, the second segment 30b fastened to the upper side in FIG. 11 moves to a location which is at left and lower side. At this time, the position detector section 163 detects the position at the uppermost portion of the support ring 40a (and the support ring 40b), and outputs its result to the rotation control section 164. Therefore, the ring rotation drive section 16 rotates the support ring 40a (40b) while adjusting its rotational angle such that the second fastening portion 430c in a location at right and lower side in FIG. 11 is moved properly to the uppermost portion.

When the second fastening portion 430c is positioned at the uppermost portion, the precision rail 17 performs the operation as shown in FIG. 9B to FIG. 10A, and places the second segment 30c of #6 in the hollow space between support rings 40a, 40b as shown in FIG. 12. Then, the precision rail 17 performs the operation as shown in. FIG. 10B to operate the jack sections 171a, 171b, to lift up the second segment 30c in the 12 o'clock direction, in the direction of the arrow Lf in FIG. 12.

Figure 13:
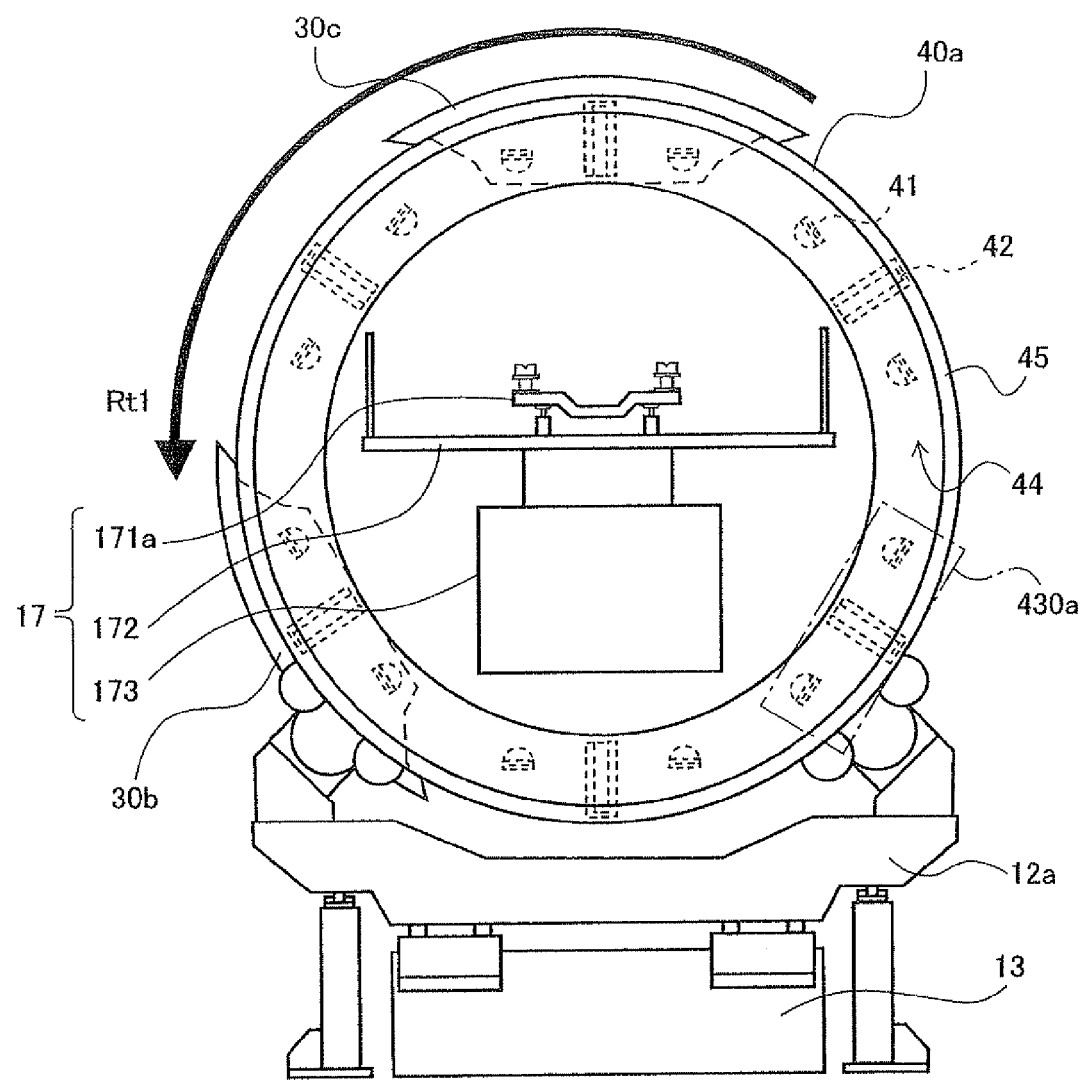
[FIG. 13]

According to this lift-up movement, the four-corner position adjustment operation, the fastening/guide operation, and the fastening/retaining operation are performed, and the second segment 30c is fastened to the support rings 40a, 40b as shown in FIG. 12 (step P04-1 in FIG. 7, second segment fastening step). Then, as indicated by the arrow Rt1, the support ring 40a, 40h are rotated about 120 degrees by the ring rotation drive section 16 (step P04-2 in FIG. 7, rotation step). Thereby, as shown in FIG. 13, the second segment 30c of #6 fastened to the upper side moves to a location at left and lower side, while the second segment 30b of #4 in this location moves to a location at right and lower side. The second fastening portion 430a moves to the uppermost portion.

Figure 14:
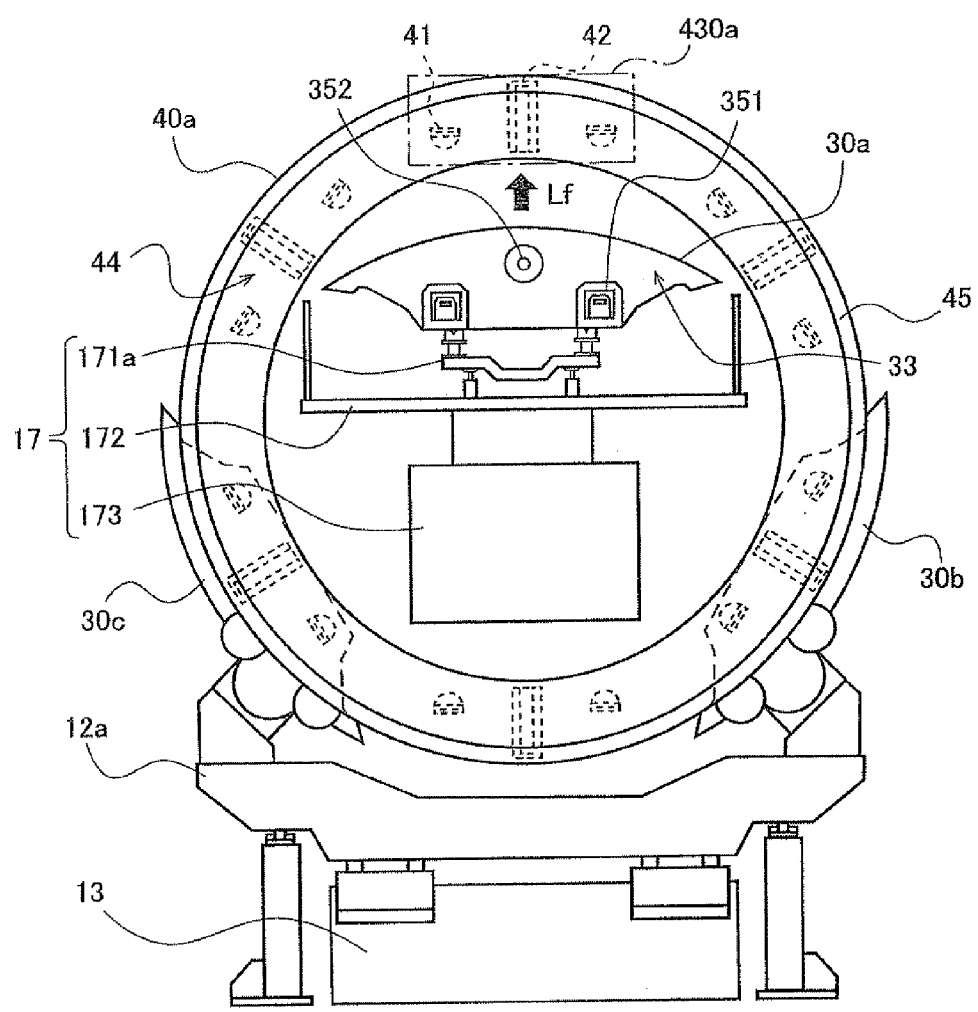
[FIG. 14]
Figure 15:
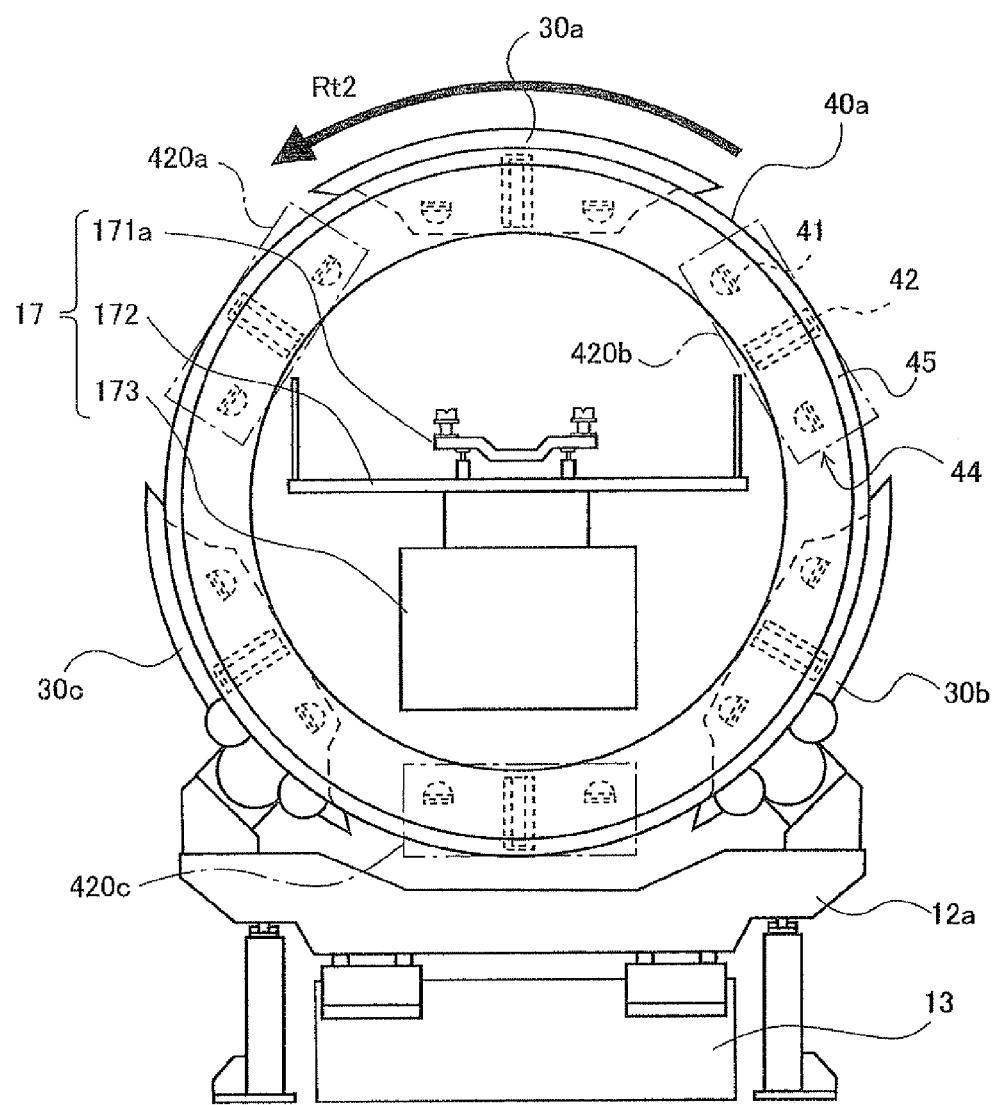
[FIG. 15]

Then, as shown in FIG. 14, the second segment 30a of #2 is lifted in the 12 o'clock direction as indicated by the arrow Lf. According to this lift-up movement, the four-corner position adjustment operation, the fastening/guide operation and the fastening/retaining operation are performed. As shown in FIG. 15, the second segment 30a of #2 is fastened to the support rings 40a 40b (step P05-1 in FIG. 7, second segment fastening step). As a result, all of the second segments 30a to 30c are fastened to the support rings 40a, 40b.

[Assembling Method of Mandrel, Fastening and Joining of First Segment]

Next, the operation of fastening each of the first segments 20a to 20c between corresponding ones of the second segments 30a to 30c occurs. A description will be given of the fastening method and fastening work of the first segments 20a to 20c, with reference to FIGS. 15, and 16 to 21, along with the specific configuration of the segment joining/retaining mechanism and the segment joining/guide mechanism. Hereinafter, a description will be given of how each of the first segments 20 is fastened in conjunction with the location numbers assigned to the segments 20, 30 shown in FIG. 4B.

Figure 16:
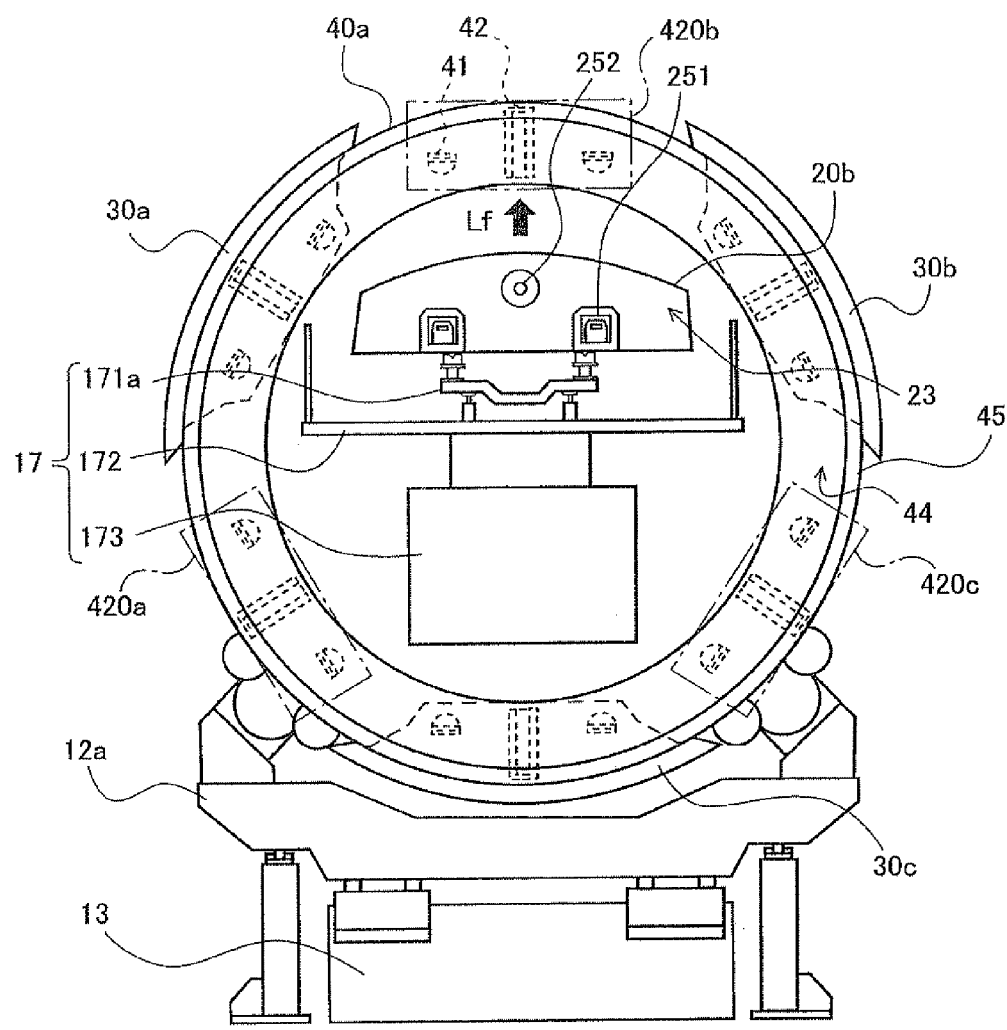
[FIG. 16]
Figure 17:
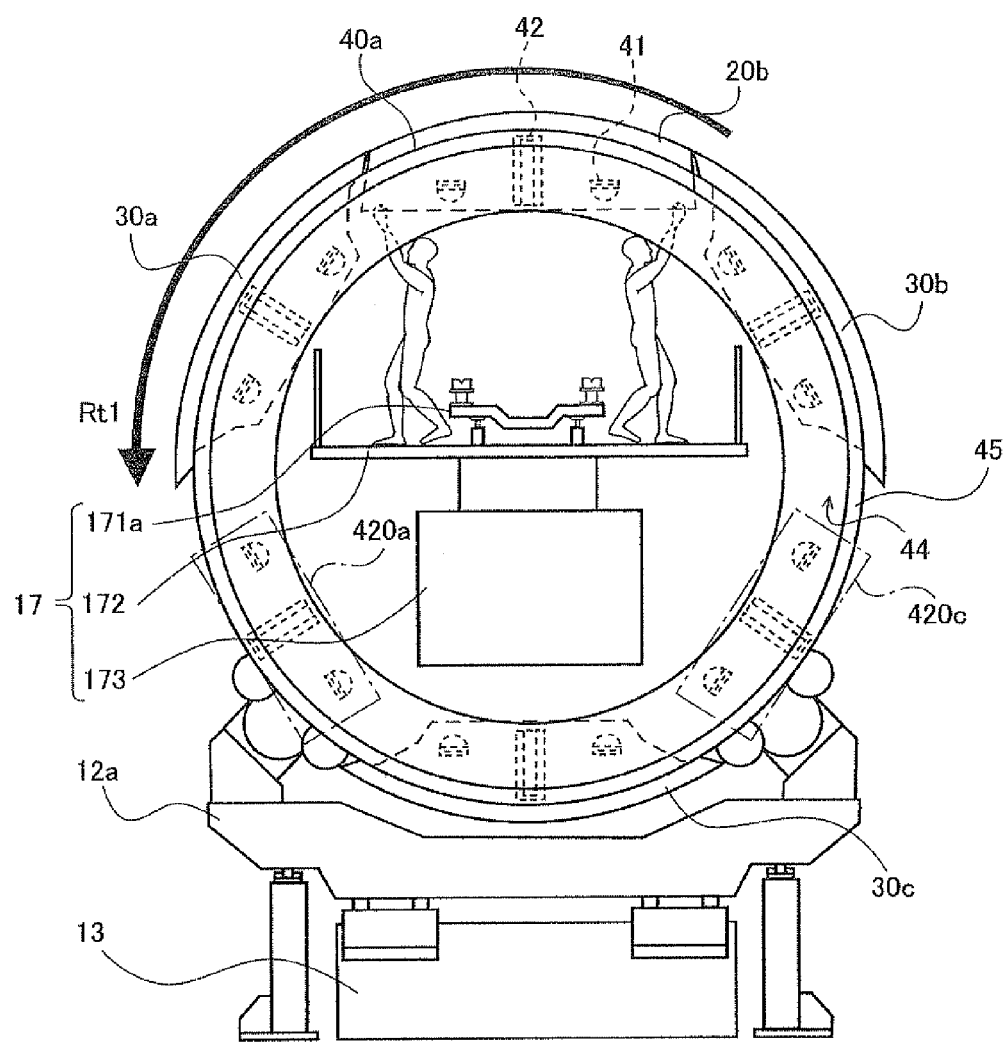
[FIG. 17]

FIG. 16 is a schematic view showing a state (placed state) in which the first segment 20a is placed on the jack section 171a (and jack section 171b) to lift the first segment 20b of #3 in the 12 o'clock direction (upward direction) and fasten it to the support ring 40a (and support ring 40b). FIG. 17 is a schematic view showing a work state in which the first segment 20b of #3 is fastened to the support ring 40a, and joined to the second segment 30a of #2 and the second segment 30b of #4. FIGS. 18 to 21 are schematic views showing a placed state or a work state of fastening and joining when the first segment 20c of #5 or the first segment 20a of #1 is fastened to the support ring 40a and to the second segments 30a to 30c sequentially.

When all of the second segments 30a to 30c are fastened, the support ring 40a (40b) is rotated about 60 degrees by the ring rotation drive section 16, as indicated by the arrow Rt2 in FIG. 15 (step P05-2 in FIG. 7, rotation step). When the second segments 30a to 30c are fastened to the support ring 40a (40b) firstly, the second segments 30a to 30c are fastened to every two locations (second fastening portions 430a to 430c) of the support ring 40a (40b). Therefore, the support ring 40a (40b) is required to be rotated with a rotational angle of 120 degrees corresponding to the locations of two segments. However, in this step, since the first segment 20a is fastened to the support ring 40a (40b), the rotational angle is 60 degrees corresponding to one segment.

As a result of this rotation, as shown in FIG. 16, the second segment 30a of #2 fastened to the upper side is moved to a location at left and upper side, the second segment 30c of #6 in a location at left and lower side is moved to a location at lower side (lowermost portion), and the second segment 30b of #4 in a location at right and lower side is moved to a location at right and upper side. The first fastening portion 420b moves to the uppermost position.

FIG. 15 also shows the first fastening portions 420a to 420c of the support ring 40a to which the first segments 20a to 20c are fastened, respectively, while FIGS. 16 to 20 show only the first fastening portions 420a to 420e to which the first segments 20a to 20c are not fastened.

When the first fastening portion 420c is positioned at the uppermost portion, the precision rail 17 performs the operation as shown in FIG. 9B to FIG. 10A, and places the first segment 20b of #3 in the hollow space between support rings 40a, 40b as shown in FIG. 16. Then, the precision rail 17 performs the operation as shown in FIG. 10B to operate the jack sections 171a, 171b, to lift the first segment 20b in the 12 o'clock direction, in the direction of the arrow Lf.

On the end surface 23 (see FIGS. 2A, 2B) of the first segment 20, the male fastener members 251 and the male guide member 252 are provided. Therefore, like the second segments 30a to 30c, the four-corner position adjustment operation, the fastening/guide operation, and the fastening/retaining operation are performed for the first segment 20b, and the first segment 20b is fastened to the support rings 40a, 40b (step P06-1 in FIG. 7, first segment fastening step), as shown in FIG. 17.

In this fastening, the first segment 20b can be fastened properly between the two second segments 30a, 30b while performing position adjustment accurately. Therefore, the obverse surface 21 of the segment 20b and the obverse surfaces 31 of the segments 30a, 30b form a smooth curved surface without substantially any level difference which is observed.

As shown in FIG. 2, on each of the side surfaces 22 of each of the first segments 20a to 20c, there are provided male joining members 261 and joining wedge members (not shown) as the segment joining/retaining mechanism, and an outer peripheral female guide member 262 and an inner peripheral male guide member (not shown) as the segment joining/guide mechanism. On each of the side surfaces 32 of each of the second segments 30a to 30c having been fastened to the support ring 40a (40b), there are provided female joining members as a segment joining/retaining mechanism, and an outer peripheral male guide member and an inner peripheral female guide member as a segment joining/guide mechanism for guiding the segment joining/retaining mechanism to a proper position. Moreover, in the present embodiment, as the segment joining/retaining mechanism, clamp members are provided.

The segment joining/retaining mechanism joins the first segment 20b to the second segments 30a, 30b (step P06-2 in FIG. 7, segment joining step). The segment joining/retaining mechanism and the segment joining/guide mechanism allow the segments 20, 30 to be joined together according to the lift-up movement of the first segment 20b. The clamp members as the segment joining/retaining mechanism allow the segments 20, 30 to be joined together by the operator's manual work for mounting the clamp member on the internal work table 172 as shown in FIG. 17. In this way, the joined state between the first segment 20b and the second segments 30a, 30b can be maintained more stably.

Hereinafter, the operation of the segment joining/guide mechanism and the operation of the segment joining/retaining mechanism are referred to as "joining/guide operation" and "joining/retaining operation", respectively.

Figure 18:
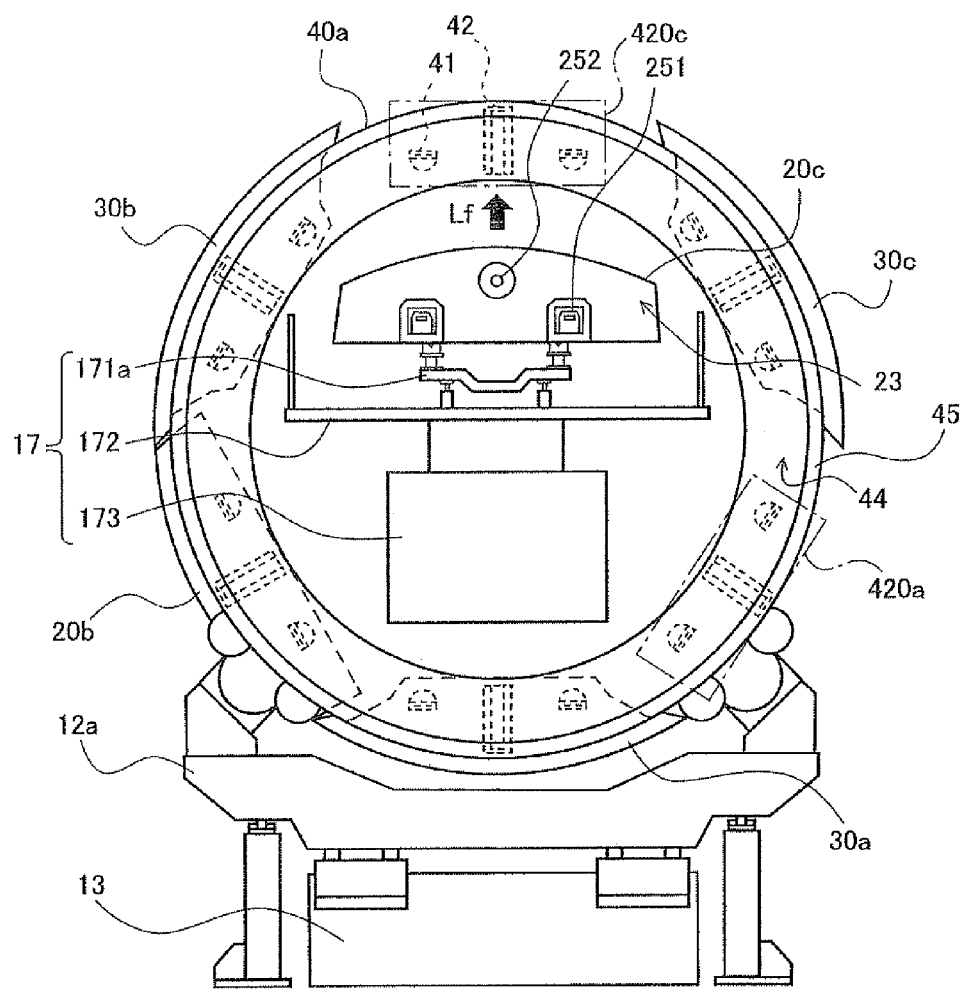
[FIG. 18]

Then, as indicated by the arrow Rt1 of FIG. 17, the support ring 40a (and the support ring 40b which is not shown) is rotated about 120 degrees by the ring rotation drive section 16 (step P06-3 in FIG. 7, rotation step). Thereby, as shown in FIG. 18, the first segment 20b fastened to the upper side moves to a location at left and lower side. Also, the second segment 30a of #2 in a location at left and upper side in FIG. 18 moves to the lowermost portion, the second segment 30c of #6 in the lowermost portion moves to a location at right and upper side, and the second segment 30b of #4 in the location at right and upper side moves to a location at left and upper side. The first fastening portion 420b moves to the uppermost position.

When the first fastening portion 420c is positioned at the uppermost portion, the precision rail 17 performs the operation as shown in FIG. 9B to FIG. 10A, and places the first segment 20c of #5 in the hollow space between support rings 40a, 40b as shown in FIG. 18. Then, the precision rail 17 performs the operation as shown in FIG. 10B to operate the jack sections 171a, 171b, to lift the first segment 20c in the 12 o'clock direction as indicated by the direction of the arrow Lf.

Figure 19:
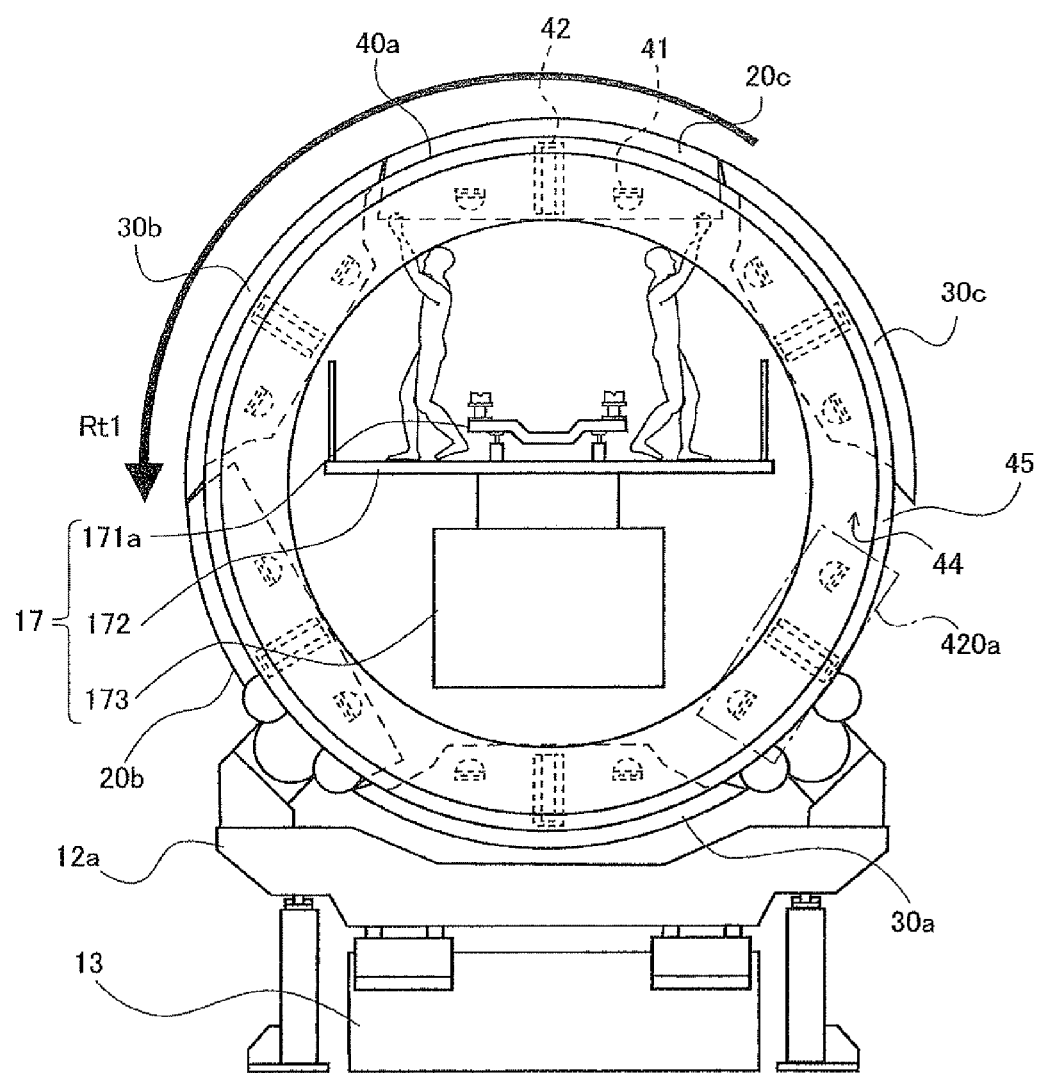
[FIG. 19]

According to this lift-up movement, the four-corner position adjustment operation, the fastening/guide operation, and the fastening/retaining operation are performed, and the first segment 20c is fastened to the support rings 40a, 40b as shown in FIG. 19 (step P07-1 in FIG. 7, first segment fastening step). Concurrently, the joining/guide operation and the joining/retaining operation are performed, and the second segments 30b, 30c are joined to the first segment 20c (step P07-2 in FIG. 7, segment joining step).

Figure 20:
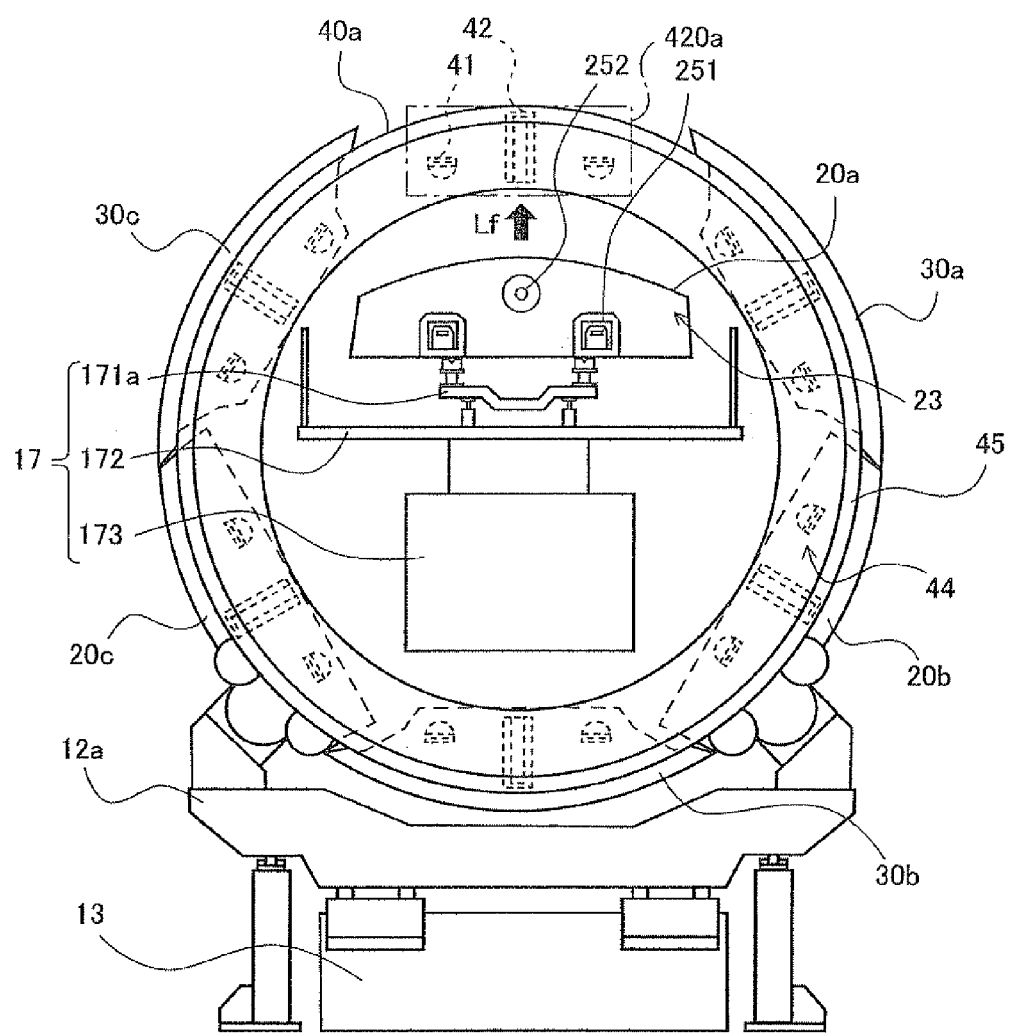
[FIG. 20]

Then, as indicated by the arrow Rt1, the support ring 40a, 40b are rotated about 120 degrees by the ring rotation drive section 16 (step P07-3 in FIG. 7, rotation step). Thereby, as shown in FIG. 20, the first segment 20c of #5 fastened to the upper side moves to a location at left and lower side, and the first segment 20b of #3 in this location moves to a location at right and lower side. Also, the second segment 30b of #4 in the location at left and upper side moves to the lowermost portion, the second segment 30a of #2 in the lowermost portion moves to a location at right and upper side, and the second segment 30c of #6 in the location at right and upper side moves to a location at left and upper side. The first fastening portion 420a moves to the uppermost portion.

When the first fastening portion 420c is positioned at the uppermost portion, the precision rail 17 performs the operation as shown in FIG. 9B to FIG. 10A, and places the first segment 20a of #1 in the hollow space between support rings 40a, 40b as shown in FIG. 20. Then, the precision rail 17 performs the operation as shown in FIG. 10B to operate the jack sections 171a, 171b, to lift the first segment 20a in the 12 o'clock direction as indicated by the direction of the arrow Lf.

Figure 21:
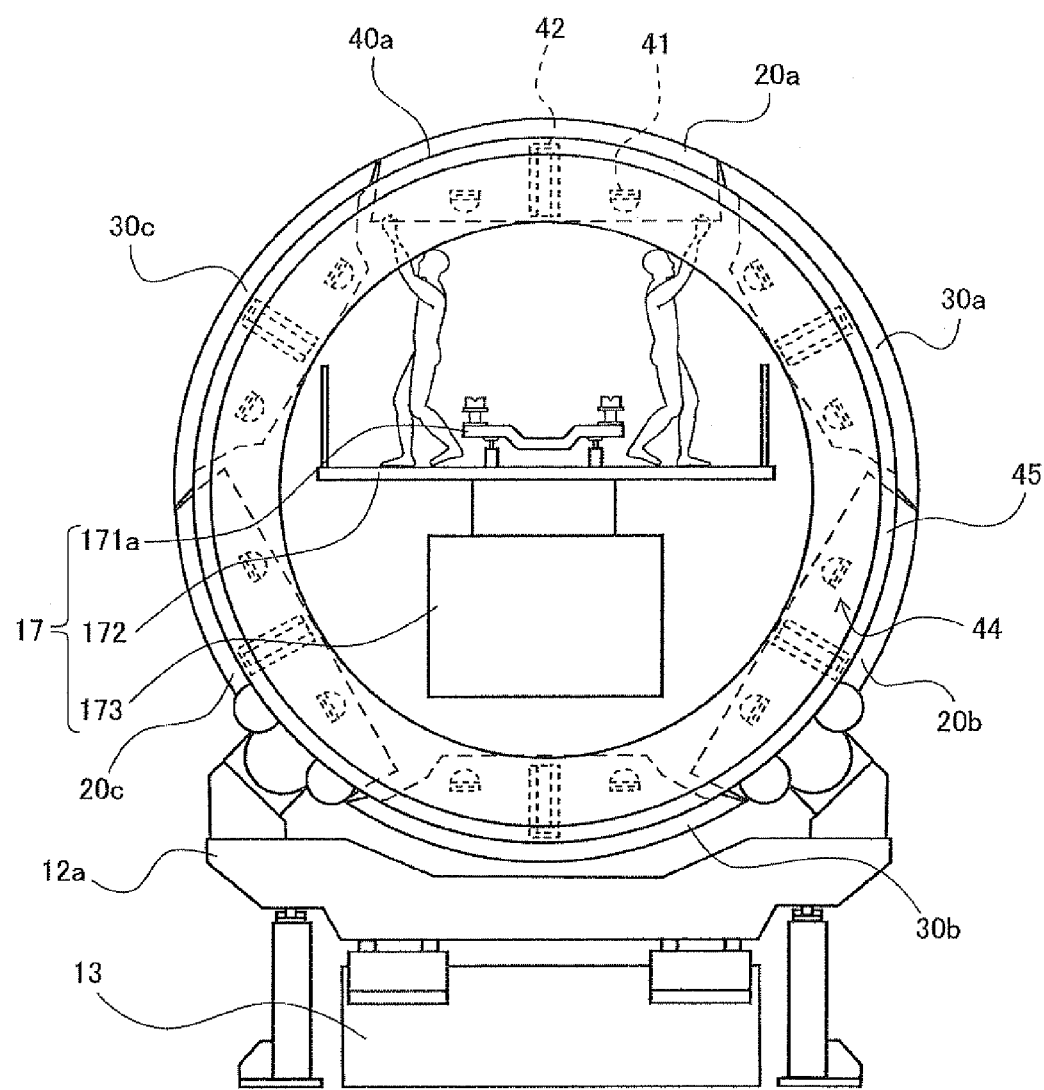
[FIG. 21]
Figure 22:
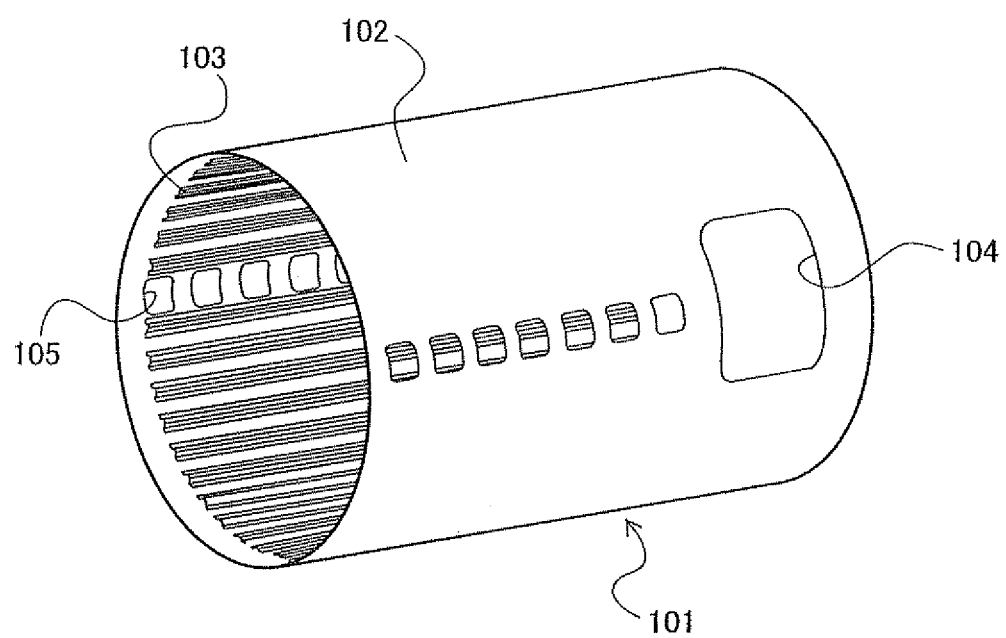
[FIG. 22]

According to this lift-up movement, the four-corner position adjustment operation, the fastening/guide operation, and the fastening/retaining operation are performed, and the first segment 20a is fastened to the support rings 40a, 40b as shown in FIG. 21 (step P08-1 in FIG. 7, first segment fastening step). Concurrently, the joining/guide operation and the joining/retaining operation are performed, to join the second segments 30a, 30c to the first segment 20a (step P08-2 in FIG. 7, segment fastening step).

Through the above steps, the first segments 20a to 20c are fastened to the support rings 40a, 40b, and all of the segments 20, 30 are joined together and retained. As a result, as shown in FIG. 1, assembling of the mold 10 including the mandrel 11 retained by the support rings 40a, 40b is completed.

Then, as described above, the rail body 173 is drawn out of the space of the support rings 40a, 40b (step P09 in FIG. 7, rail drawing step), and the mold 10 including the mandrel 11 and the support rings 40a, 40b is moved to a next step by the carriage 13 (step P10 shown in FIG. 7).

The assembling method of the mandrel of the present embodiment, includes the segment fastening step in which one segment (first segments 20a to 20c or the second segments 30a to 30c) to be fastened is fastened to one specified fastening portion (first fastening portions 420a to 420c or second fastening portions 430a to 430c) which is one of a plurality of fastening portions set along the circumferential direction of each of the pair of support rings 40a, 40b facing each other, and the rotation step in which the pair of support rings are rotated to position the specified fastening portion at the uppermost portion of the support ring 40a (40b) before the segment fastening step.

In this method, in the segment fastening step, one segment 20 (30) which is the fastened target is placed between the pair of support rings 40a, 40b, is lifted in the vertically upward direction corresponding to the specified fastening portion, and fastened to the pair of support rings 40a, 40b. When another segment 20 (30) has been already fastened, the fastened segment 20 (30) and the segment 20 (30) to be fastened are joined together at their side surfaces. In this method, the segment which is the fastened target is fastened to the uppermost portion of the support ring which is a predetermined fastening position. The segment which is the fastened target moves only in the vertical direction. Therefore, the segment which is the fastened target can be moved while stably maintaining this segment with a fixed attitude. Thus, positioning accuracy can be improved.

[Modified Example]

The assembling method of the mandrel of the present invention is applicable to a mandrel 11 of another configuration as well as the mandrel 11 including three first segments 20 and three second segments 30, as described above. The assembling method of the mandrel of the present invention may be suitably used, so long as the mandrel 11 which is to be assembled includes a plurality of segments having a substantially rectangular shape, and the segments are lifted in the vertically upward direction and fastened to the support ring, because the segment fastening step and the rotation step can be carried out.

Although the precision rail 17 of FIG. 5 includes the three conveyor sections 174a to 174c and the three jack sections 171a to 171c, the configuration of the precision rail 17 is not limited to this, so long as the precision rail 17 has segment support members capable of supporting at least portions in the vicinity of the four corners of the segment which is the fastened target and displacing the portions independently in the vertical direction, between the support rings 40a, 40b, in a state in which the rail body 173 is inserted into the space of the support rings 40a, 40b. Therefore, segment support members other than the rod-like segment support members (support rod members 171a-1, 171a-2, 171b-1, 171b-2) as shown in FIG. 6A may be used. Or, four jack sections may be provided to respectively support the portions in the vicinity of the four corners of the segment, or one jack section may support all portions in the vicinity of the four corners of the segment.

The mandrel assembling apparatus of for use in the present invention is not limited to the precision rail 17 of FIG. 5, but another assembling apparatus may be used. Nonetheless, the precision rail 17 of FIG. 5 is a particularly preferable assembling apparatus.

The present invention is not limited to the above described embodiments, but may be changed in various ways within a scope of the claims, and embodiments obtained by suitably combining technical means disclosed in different embodiments or plural modified examples may be included in the technical scope of the present invention.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Industrial Applicability

The present invention is widely used in fields of molding of composite material structures which are huge in size and have a substantially cylindrical shape, such as a fuselage of an aircraft.

The invention claimed is:

1. An assembling method of a mandrel for assembling a tubular mandrel by joining a plurality of segments together, the segments having a substantially rectangular shape, and the segments being parts into which the mandrel is divided along a center axis direction, the assembling method comprising:

a segment fastening step of fastening one of the segments, which is a fastened target, to a specified fastening portion, the specified fastening portion being one of a plurality of fastening portions set along a circumferential direction on each of a pair of support rings facing each other, wherein the fastened target is (i) placed between the pair of support rings; (ii) lifted up to a height position corresponding to the specified fastening portion along a vertical direction; and (iii) is fastened to the pair of support rings; and a rotation step of rotating the pair of support rings to position the specified fastening portion at an uppermost portion of each of the support rings before the segment fastening step, each of the pair of support rings being supported from below at two or more locations sandwiching a vertical line passing through a center axis of each of the pair of support rings, each of the pair of support rings being applied with a rotational force, and each of the pair of support rings being supported on a respective upper portion such that movement of each of the pair of support rings in a direction of the center axis is restricted.

2. The assembling method of the mandrel according to claim 1, further comprising:

a segment joining step of, when the segment has been fastened to at least one of two fastening portions adjacent to the specified fastening portion, joining the segment which is the fastened target to the segment adjacent to the specified fastening portion, after the segment fastening step.

3. The assembling method of the mandrel according to claim 1, wherein in the segment fastening step, the segment which is the fastened target is lifted up toward the specified fastening portion in such a manner that at least portions in the vicinity of four corners of the segment having the substantially rectangular shape are supported and displaced in an upward direction.

4. The assembling method of the mandrel according to claim 1, wherein in the segment fastening step, an annular fastening/guide mechanism provided between the support rings and the segment which is the fastened target guides the segment being lifted up to the specified fastening portion, and fastens the segment having reached the specified fastening portion to the support ring.

5. The assembling method of the mandrel according to claim 1, wherein in the rotation step, a position detector section detects that a detected portion provided on each of the pair of support rings has reached a predetermined detection position by rotation of each of the pair of support rings, to determine that the specified fastening portion is positioned at an uppermost portion of each of the pair of support rings.

6. The assembling method of the mandrel according to claim 1, further comprising:

a support ring installation step of placing the pair of support rings such that the support rings face each other to allow the segment to be fastened to the support rings, the support ring installation step being performed before the segment fastening step, wherein in the support ring installation step, the pair of support rings are installed such that the specified fastening portion corresponding to the segment fastened first is positioned at the uppermost portion of each of the pair of support rings.

7. The assembling method of the mandrel according to claim 1, wherein the plurality of segments include at least one first segment and at least one second segment that are different in shape;

the plurality of fastening portions set on each of the pair of support rings include a first fastening portion to which the first segment is fastened, and a second fastening portion to which the second segment is fastened;

the first fastening portion and the second fastening portion are set alternately on each of the pair of support rings along a circumferential direction of the support ring; and the segment fastening step includes a first segment fastening step of fastening the first segment to the first fastening portion, and a second segment fastening step of fastening the second segment to the second fastening portion.

8. The assembling method of the mandrel according to claim 7, wherein an obverse surface of the second segment having the substantially rectangular shape, which is a part of an outer peripheral surface of the mandrel, has a greater area than an obverse surface of the first segment, which is a part of the outer peripheral surface of the mandrel;

the first segment fastening step is performed after each of the at least one second segment is fastened to each of the pair of support rings at the second fastening portion corresponding to each of the at least one second fastening segment along the circumferential direction in the second segment fastening step; and in the first segment fastening step, the first segment placed between the pair of support rings is lifted up to a location between two second segments at a height corresponding to the first fastening portion, is fastened to the pair of support rings and is joined to the second segment adjacent to the first segment.

* * * * *